(12) United States Patent
Masuko

(10) Patent No.: US 9,996,516 B2
(45) Date of Patent: Jun. 12, 2018

(54) IMAGE PROCESSING DEVICE FOR DETERMINING A DISPLAY POSITION OF AN ANNOTATION

(75) Inventor: Soh Masuko, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 135 days.

(21) Appl. No.: 14/401,117

(22) PCT Filed: May 16, 2012

(86) PCT No.: PCT/JP2012/062511
§ 371 (c)(1),
(2), (4) Date: Nov. 14, 2014

(87) PCT Pub. No.: WO2013/171857
PCT Pub. Date: Nov. 21, 2013

(65) Prior Publication Data
US 2015/0149883 A1 May 28, 2015

(51) Int. Cl.
*G06F 17/00* (2006.01)
*G06F 17/24* (2006.01)
*G06T 11/00* (2006.01)

(52) U.S. Cl.
CPC ............ *G06F 17/241* (2013.01); *G06T 11/00* (2013.01)

(58) Field of Classification Search
CPC ................................................... G06F 17/241
See application file for complete search history.

(56) References Cited

U.S. PATENT DOCUMENTS

| | | | | |
|---|---|---|---|---|
| 6,041,335 A | * | 3/2000 | Merritt | G06F 17/212 715/203 |
| 6,230,169 B1 | * | 5/2001 | Nagae | G06F 17/241 715/203 |
| 7,636,883 B2 | * | 12/2009 | Albornoz | G06F 17/2247 715/231 |

(Continued)

FOREIGN PATENT DOCUMENTS

| | | |
|---|---|---|
| JP | H04-310997 A | 11/1992 |
| JP | H06-131143 A | 5/1994 |

(Continued)

OTHER PUBLICATIONS

Gu et al., "Automatic Image Annotation Exploiting Textual and Visual Saliency" C.K. Loo et al. (Eds.): ICONIP 2014, Part III, LNCS 8836, pp. 95-102, 2014.*

(Continued)

*Primary Examiner* — Amelia Tapp
(74) *Attorney, Agent, or Firm* — HEA Law PLLC

(57) ABSTRACT

Provided is an image processing device capable of displaying an annotation in an appropriate position. An image obtaining unit obtains an image. An annotation target information obtaining unit obtains annotation target information for indicating an annotation target to which to add an annotation, the annotation target being including in the image. An annotation information obtaining unit obtains annotation information indicating an annotation. A display position determination unit determines a display position of the annotation based on the position or the area of the annotation target. A data output unit outputs data on the image with the annotation displayed in the display position determined by the display position determination unit.

22 Claims, 14 Drawing Sheets

(56) References Cited

U.S. PATENT DOCUMENTS

| | | | |
|---|---|---|---|
| 8,035,657 B2 * | 10/2011 | Vau | H04N 1/3871 345/629 |
| 8,199,242 B2 * | 6/2012 | Sugihara | H04N 1/00331 348/333.12 |
| 9,223,769 B2 * | 12/2015 | Tsibulevskiy | G06F 17/30014 |
| 2009/0041352 A1 * | 2/2009 | Okamoto | G06T 11/60 382/176 |
| 2009/0185046 A1 | 7/2009 | Sugihara | |
| 2011/0243372 A1 * | 10/2011 | Li | G06T 11/00 382/100 |
| 2012/0218305 A1 * | 8/2012 | Patterson | G06F 17/2235 345/652 |
| 2012/0300089 A1 * | 11/2012 | Sbaiz | H04N 1/00323 348/222.1 |

FOREIGN PATENT DOCUMENTS

| | | |
|---|---|---|
| JP | 2005-159850 A | 6/2005 |
| JP | 2006-041614 A | 2/2006 |
| JP | 2007-004677 A | 1/2007 |
| WO | 2007/108200 A1 | 9/2007 |

OTHER PUBLICATIONS

The partial translation of the Office Action for corresponding Japanese Patent Application No. 2014-515408 dated Jan. 6, 2015.
International Search Report for PCT/JP2012/062511 dated Jul. 24, 2012.

* cited by examiner

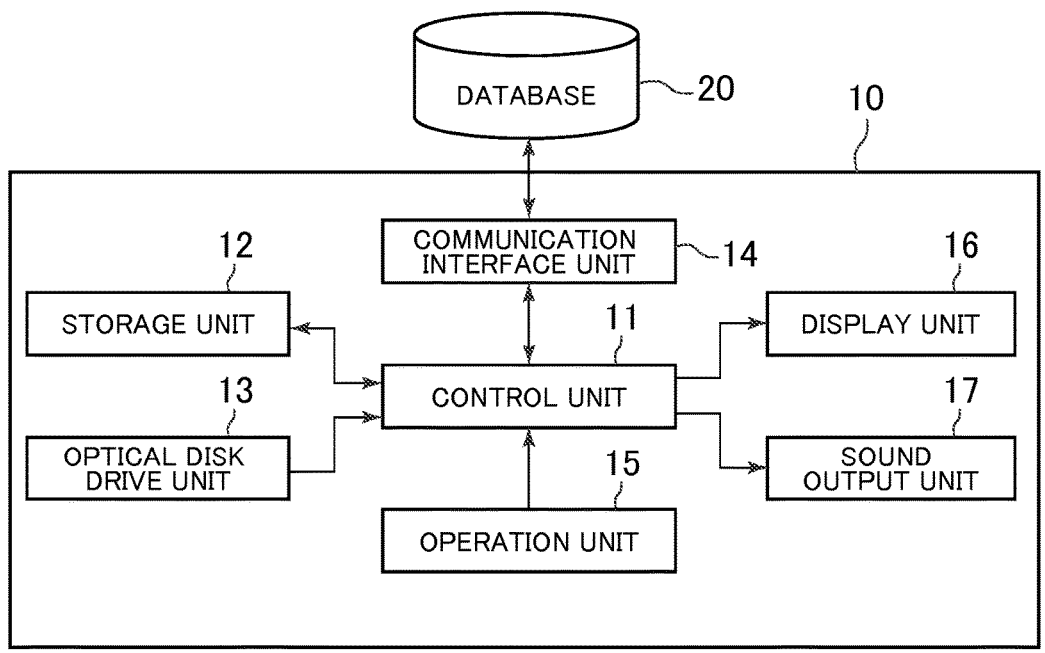
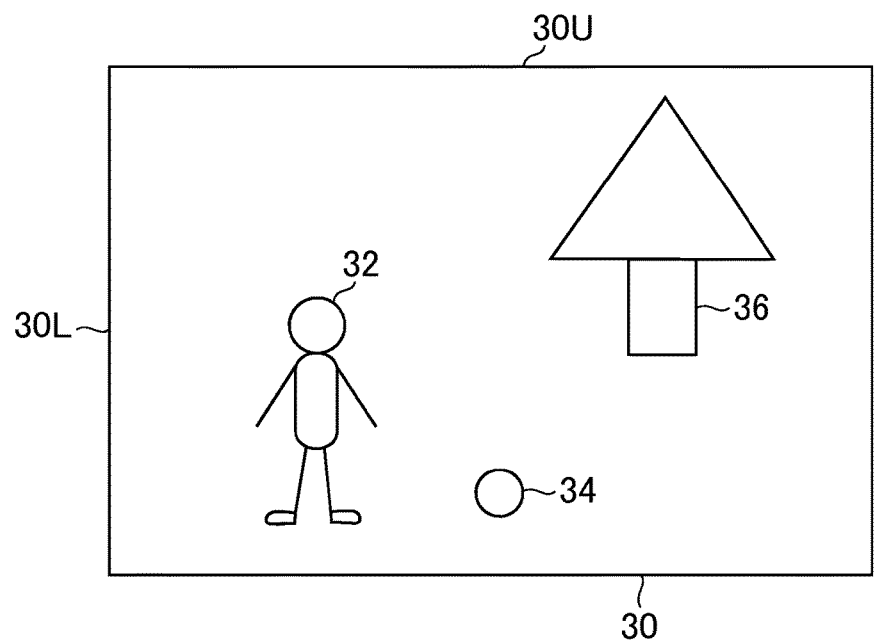

FIG.13A

| TYPE | ANNOTATION |
|---|---|
| FIRST TYPE | ANNOTATION OF FIVE OR FEWER LETTERS |
| SECOND TYPE | ANNOTATION OF SIX TO TEN LETTERS |
| THIRD TYPE | ANNOTATION OF ELEVEN OR MORE LETTERS |

FIG.13B

| TYPE | ANNOTATION |
|---|---|
| FIRST TYPE | ANNOTATION WITH BLACK DISPLAY COLOR |
| SECOND TYPE | ANNOTATION WITH RED DISPLAY COLOR |
| THIRD TYPE | ANNOTATION WITH BLUE DISPLAY COLOR |
| ... | ... |

FIG.13C

| TYPE | ANNOTATION |
|---|---|
| FIRST TYPE | ANNOTATION IN DISPLAY SIZE OF P1 OR SMALLER |
| SECOND TYPE | ANNOTATION IN DISPLAY SIZE OF P1 INCLUSIVE TO P2 EXCLUSIVE |
| THIRD TYPE | ANNOTATION IN DISPLAY SIZE OF P2 OR LARGER |

FIG.13D

| TYPE | ANNOTATION |
|---|---|
| FIRST TYPE | ANNOTATION IN HORIZONTAL WRITING |
| SECOND TYPE | ANNOTATION IN VERTICAL WRITING |

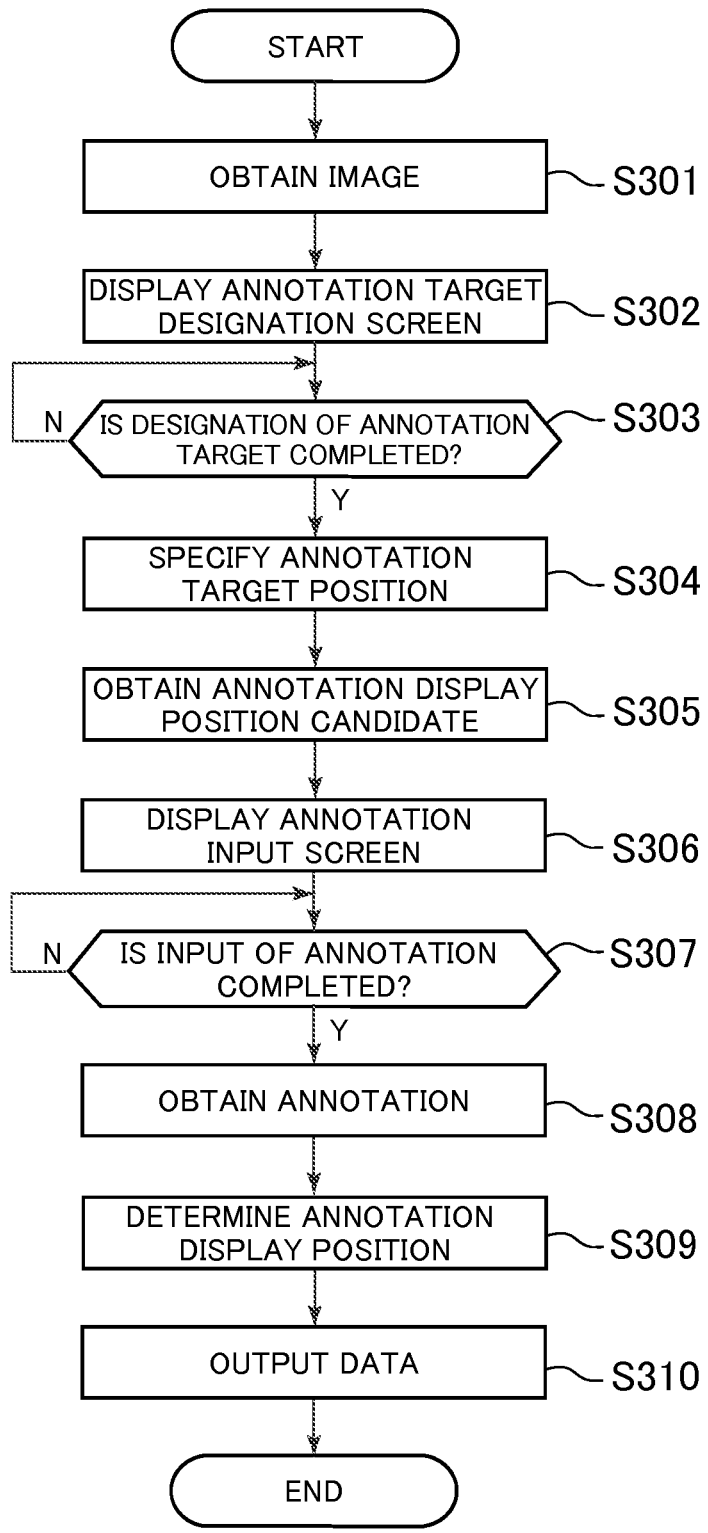

IMAGE PROCESSING DEVICE FOR DETERMINING A DISPLAY POSITION OF AN ANNOTATION

CROSS REFERENCE TO RELATED APPLICATIONS

This application is a National Stage of International Application No. PCT/JP2012/062511 filed May 16, 2012, the content of which is incorporated herein by reference in its entirety.

TECHNICAL FIELD

The present invention relates to an image processing device, an image processing device control method, a program, and an information storage medium.

BACKGROUND ART

There has been known an image processing device that can add an annotation to an annotation target (an object to which to add an annotation) included in an image. As such an image processing device, for example, there have been known an image processing device that displays an annotation inputted by a user in a position in an image designated by the user and an image processing device that changes the display position of an annotation displayed in an image to a position designated by a user.

CITATION LIST

Patent Literature

Patent Literature 1: JP 6-131143 A

SUMMARY OF INVENTION

Technical Problem

It is desirable that the display position of an annotation is set in a position appropriate in view of the annotation and the annotation target. In a conventional image processing device, however, an annotation may not be displayed in an appropriate position. For example, in a device disclosed in Patent Literature 1, an annotation may not be displayed in an appropriate position, and in such a case, a user needs to change the display position of the annotation.

The present invention has been conceived in view of the above, and aims to provide an image processing device, an image processing device control method, a program, and an information storage medium that can display an annotation in an appropriate position.

Solution to Problem

In order to achieve the above mentioned object, an image processing device according to the present invention includes image obtaining means for obtaining an image; annotation target information obtaining means for obtaining annotation target information for indicating an annotation target to which to add an annotation, the annotation target being including in the image; annotation information obtaining means for obtaining annotation information indicating an annotation; display position determination means for determining a display position of the annotation based on a position or an area of the annotation target; and data output means for outputting data on the image with the annotation displayed in the display position determined by the display position determination means.

An image processing device control method according to the present invention includes an image obtaining step of obtaining an image; an annotation target information obtaining step of obtaining annotation target information for indicating an annotation target to which to add an annotation, the annotation target being including in the image; an annotation information obtaining step of obtaining annotation information indicating an annotation; a display position determination step of determining a display position of the annotation based on a position or an area of the annotation target; and a data output step of outputting data on the image with the annotation displayed in the display position determined at the display position determination step.

A program according to the present invention is a program for causing a computer to function as image obtaining means for obtaining an image; annotation target information obtaining means for obtaining annotation target information for indicating an annotation target to which to add an annotation, the annotation target being including in the image; annotation information obtaining means for obtaining annotation information indicating an annotation; display position determination means for determining a display position of the annotation based on a position or an area of the annotation target; and data output means for outputting data on the image with the annotation displayed in the display position determined by the display position determination means.

An information storage medium according to the present invention is a computer readable information storage medium storing a program for causing a computer to function as image obtaining means for obtaining an image; annotation target information obtaining means for obtaining annotation target information for indicating an annotation target to which to add an annotation, the annotation target being including in the image; annotation information obtaining means for obtaining annotation information indicating an annotation; display position determination means for determining a display position of the annotation based on a position or an area of the annotation target; and data output means for outputting data on the image with the annotation displayed in the display position determined by the display position determination means.

In one embodiment of the present invention, another annotation may be already added to the image, and the display position determination means may include means for determining the display position of the annotation based on the position or the area of the annotation target and a display position of the other annotation.

In one embodiment of the present invention, another annotation may be already added to the image, and the display position determination means may include means for determining the display position of the annotation based on the position or the area of the annotation target and a position or an area of an annotation target corresponding to the other annotation.

In one embodiment of the present invention, another annotation may be already added to the image, and the display position determination means may include means for determining the display position of the annotation and a new display position of the other annotation based on the position or the area of the annotation target and a position or an area of an annotation target corresponding to the other annotation.

In one embodiment of the present invention, the display position determination means may include means for determining, as to each of a plurality of kinds of annotation types, a display position of an annotation belonging to the type in a case where it is assumed that the annotation is added to the annotation target, based on the position or the area of the annotation target, and obtaining the determined display position as a display position candidate corresponding to the type, and means for determining, when the annotation information is obtained by the annotation obtaining means, a display position of an annotation indicated by the annotation information based on a display position candidate corresponding to a type to which the annotation belongs.

In one embodiment of the present invention, the plurality of kinds of annotation types may be set based on at least one of a length, a display color, a display size, and a writing direction of an annotation.

In one embodiment of the present invention, the display position determination means may include means for determining, as to each of a plurality of kinds of length information concerning a length of an annotation, a display position of an annotation having a length indicated by the length information in a case where it is assumed that the annotation is added to the annotation target, based on the position or the area of the annotation target, and obtaining the determined display position as a display position candidate corresponding to the length information, and means for determining, when the annotation information is obtained by the annotation obtaining means, the display position of the annotation indicated by the annotation information based on a display position candidate corresponding to a length of the annotation.

In one embodiment of the present invention, the display position determination means may include means for determining, as to each of a plurality of kinds of display color information concerning a display color of an annotation, a display position of an annotation having a display color indicated by the display color information in a case where it is assumed that the annotation is added to the annotation target, based on the position or the area of the annotation target, and obtaining the determined display position as a display position candidate corresponding to the display color information, and means for determining, when the annotation information is obtained by the annotation obtaining means, the display position of the annotation indicated by the annotation information based on a display position candidate corresponding to a display color of the annotation.

In one embodiment of the present invention, the display position determination means may include means for determining, as to each of a plurality of kinds of display size information concerning a display size of an annotation, a display position of an annotation having a display size indicated by the display size information in a case where it is assumed that the annotation is added to the annotation target, based on the position or the area of the annotation target, and obtaining the determined display position as a display position candidate corresponding to the display size information, and means for determining, when the annotation information is obtained by the annotation obtaining means, the display position of the annotation indicated by the annotation information based on a display position candidate corresponding to a display size of the annotation.

In one embodiment of the present invention, the display position determination means may include means for determining, as to each of a plurality of kinds of writing direction information concerning a writing direction of an annotation, a display position of an annotation having a writing direction indicated by the writing direction information in a case where it is assumed that the annotation is added to the annotation target, based on the position or the area of the annotation target, and obtaining the determined display position as a display position candidate corresponding to the writing direction information, and means for determining, when the annotation information is obtained by the annotation obtaining means, the display position of the annotation indicated by the annotation information based on a display position candidate corresponding to a writing direction of the annotation.

In one embodiment of the present invention, another annotation may be already added to the image, and the display position determination means may include means for determining, as to each of a plurality of kinds of annotation types, the display position of the annotation and a new display position of the other annotation assuming a case where the annotation belongs to the type, based on the position or the area of the annotation target and a position or an area of an annotation target corresponding to the other annotation, and obtaining the determined display position as a display position candidate corresponding to the type, and means for determining, when the annotation information is obtained by the annotation obtaining means, the display position of the annotation indicated by the annotation information and the new display position of the other annotation based on a display position candidate corresponding to a type to which the annotation belongs.

In one embodiment of the present invention, the display position determination means may include means for determining the display position of the annotation based on at least one of a size and a shape of the area of the annotation target.

In one embodiment of the present invention, the display position determination means may include means for determining the display position of the annotation based on the position or the area of the annotation target and at least one of a length, a display color, a display size, and a writing direction of the annotation.

In one embodiment of the present invention, the image processing device may include means for obtaining an edge amount of a pixel of the image, and the display position determination means may include means for determining the display position of the annotation based on the edge amount of the pixel of the image and the position or the area of the annotation target.

In one embodiment of the present invention, the image processing device may include means for obtaining a saliency map of the image, and the display position determination means may include means for determining the display position of the annotation based on the saliency map and the position or area of the annotation target.

In one embodiment of the present invention, the image processing device may include means for specifying an annotation target candidate included in the image; and means for determining the display position of the annotation in a case where it is assumed that the annotation is added to the annotation target candidate, based on a position or an area of the annotation target candidate, and obtaining the determined display position as the display position candidate, and the display position determination means may include means for determining the display position of the annotation based on the display position candidate, when the annotation target indicated by the annotation target information corresponds to the annotation target candidate.

Advantageous Effects of Invention

According to the present invention, it is possible to display an annotation in an appropriate position.

BRIEF DESCRIPTION OF DRAWINGS

FIG. 1 shows one example of a hardware structure of an image processing device according to an embodiment of the present invention;

FIG. 2 shows one example of an image;

FIG. 13A explains one example of an annotation type;

FIG. 13B explains another example of the annotation type;

FIG. 13C explains still another one example of the annotation type;

FIG. 13D explains still another one example of the annotation type;

FIG. 14 is a flowchart showing still another example of the processing that is executed in the image processing device;

DESCRIPTION OF EMBODIMENTS

Figure 3:
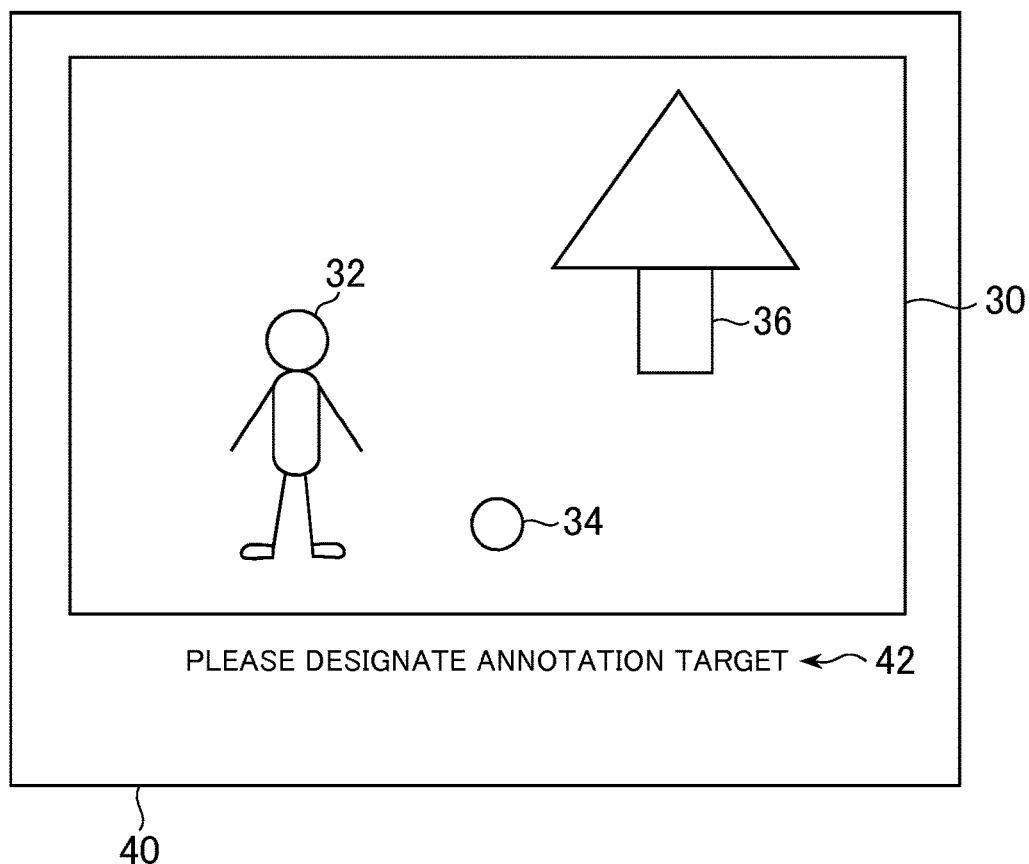
FIG. 3 shows one example of an annotation target designation screen.

In the following, examples of embodiments of the present invention will be described in detail based on the drawings.

First Embodiment

Initially, a first embodiment of the present invention will be described. An image processing device according to the first embodiment of the present invention is implemented using, for example, a desk top computer, a lap top computer, a tablet computer, a server computer, or the like. FIG. 1 shows one example of a hardware structure of an image processing device 10 according to the first embodiment.

As shown in FIG. 1, the image processing device 10 includes a control unit 11, a storage unit 12, an optical disk drive unit 13, a communication interface unit 14, an operation unit 15, a display unit 16, and a sound output unit 17.

The control unit 11 includes, for example, one or more microprocessors, and executes information processing according to an operating system or a program stored in the storage unit 12. The storage unit 12 includes, for example, a RAM, a hard disk, or a solid state drive. The optical disk drive unit 13 reads a program and data stored in an optical disk (an information storage medium).

A program and data are supplied to the storage unit 12 via an optical disk. That is, an optical disk that records a program and data is mounted in the optical disk drive unit 13, and the program and data are read from the optical disk by the optical disk drive unit 13 to be stored in the storage unit 12. The optical disk drive unit 13, however, is not an indispensable structural element. A structural element for reading a program or data recorded in an information storage medium other than an optical disk (for example, a memory card) may be included instead of the optical disk drive unit 13. In this case, a program and data may be supplied to the storage unit 12 via an information storage medium other than an optical disk.

The communication interface unit 14 is an interface for connecting the image processing device 10 to a communication network. The image processing device 10 can exchange data with other devices (for example, a server or the like) via the communication network. A program and data may be supplied to the storage unit 12 via the communication network.

The operation unit 15 is for operation by a user. For example, the operation unit 15 includes a keyboard or a button for inputting a letter. The operation unit 15 includes a pointing device (a touch pad, a mouse, a stick, or the like) for designating a position on a screen displayed on the display unit 16. Note that a so-called software keyboard may be displayed on the display unit 16.

The display unit 16 is, for example, a liquid crystal display or the like, and the sound output unit 17 is, for example, a speaker, a headphone terminal, or the like.

The image processing device 10 can access a database 20. The database 20 may be implemented in a device (for example, a server) other than the image processing device 10 and may be implemented in the image processing device 10.

An image is stored in the storage unit 12 or the database 20. FIG. 2 shows one example of an image stored in the storage unit 12 or the database 20. A person 32, a ball 34, and a tree 36 are shown in the image 30 shown in FIG. 2.

In the image processing device 10, it is possible to add an annotation to an annotation target (an object to which to add an annotation) included in the image 30. In the following, a procedure to be performed by a user to add an annotation will be described.

In a case of adding an annotation, initially, a screen for designating an annotation target (hereinafter referred to as an "annotation target designation screen") is displayed on the display unit 16. Note that the "annotation target" refers to an object to which to add an annotation (in other words, an object with which an annotation is associated). For example, an object included in the image 30 can be the "annotation target". In the image 30 shown in FIG. 2, the person 32, the ball 34, or the tree 36 can be the "annotation target".

FIG. 3 shows one example of the annotation target designation screen 40. As shown in FIG. 3, the image 30 is displayed on the annotation target designation screen 40. Further, a message 42 for requesting a user to designate an annotation target is displayed on the annotation target designation screen 40. Designation of an annotation target by the user can be received on the annotation target designation screen 40.

Specifically, a user designates an annotation target on the annotation target designation screen 40 using a pointing device or the like. In a case of inputting an annotation for the person 32 shown in the image 30, the user designates the person 32 as the annotation target. Specifically, for example, the user points out a point within an area where the person 32 is shown or inputs a locus so as to encircle the person 32, to thereby designate the person 32 as the annotation target.

Figure 4:
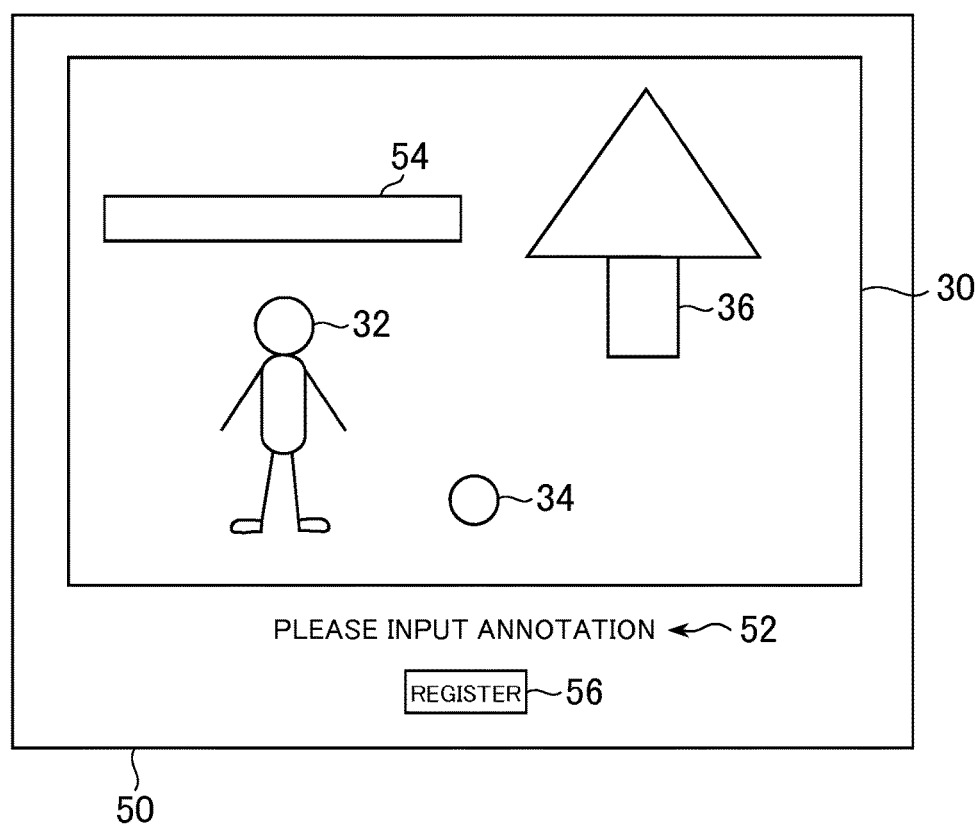
FIG. 4 shows one example of an annotation input screen.

When the annotation target is designated, a screen for inputting an annotation (hereinafter referred to as an "annotation input screen") is displayed on the display unit 16. FIG. 4 shows one example of the annotation input screen. The annotation input screen 50 shown in FIG. 4 is an annotation input screen that is displayed when the person 32 is designated as the annotation target.

As shown in FIG. 4, the image 30 is displayed on the annotation input screen 50. Further, a message 52 for requesting a user to input an annotation is displayed on the annotation input screen 50. Input of an annotation by a user is received on the annotation input screen 50.

The annotation input screen 50 includes an input space 54 and a register button 56. An annotation inputted by a user using a keyboard or the like is displayed in the input space 54. The input space 54 is displayed within the image 30. The display position of the input space 54 is determined based on the position of the annotation target (the person 32). For example, the input space 54 is displayed near the annotation target. After input of the annotation for the annotation target, the user clicks the register button 56.

A user may be able to designate a display color, a display size (a letter size), a writing direction (horizontal writing or vertical writing), or the like, of the annotation on the annotation input screen 50. A user may be able to select any of a plurality of annotations prepared in advance on the annotation input screen 50.

When the register button 56 on the annotation input screen 50 is clicked, data on the annotation target designated by a user and the annotation inputted by the user is stored in the storage unit 12 or a database in association with the image 30. Further, the image 30 to which the annotation inputted by the user is added is displayed on the display unit 16.

Figure 5:
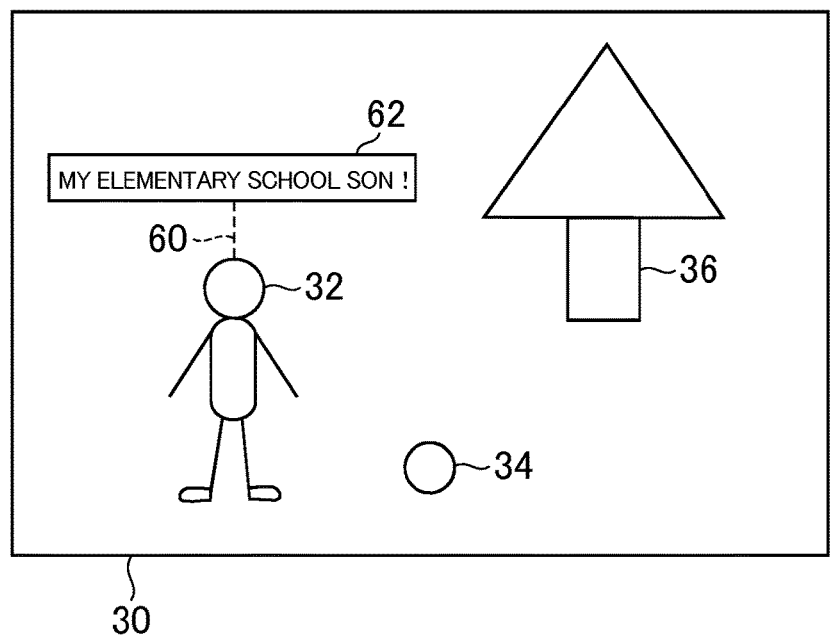
FIG. 5 shows one example of an image to which an annotation is added.

FIG. 5 shows one example of the image 30 with the annotation inputted by a user added thereto. In the image 30 shown in FIG. 5, the annotation 62 inputted by the user is displayed in association with the person 32, that is, the annotation target. In the image 30 shown in FIG. 5, a correlation line 60 for correlating the annotation 62 and the annotation target (the person 32) is displayed.

In the image processing device 10, an annotation inputted by a user is displayed in an appropriate position. In the following, a technique for displaying an annotation inputted by a user in an appropriate position will be described.

Figure 6:
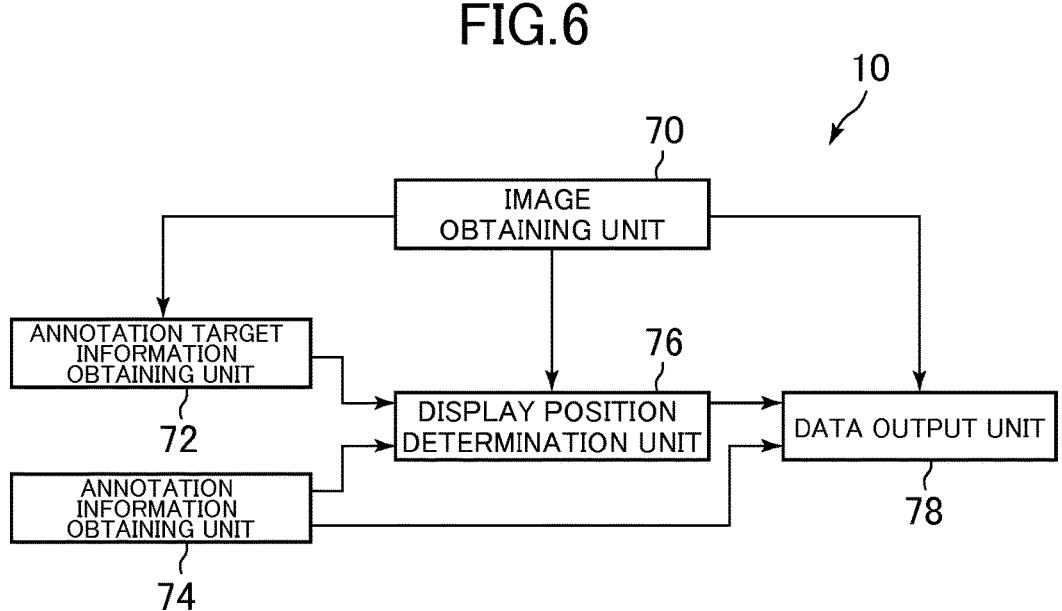
FIG. 6 is a function block diagram of the image processing device.

FIG. 6 is a function block diagram showing function blocks relevant to the present invention among those implemented in the image processing device 10. As shown in FIG. 6, the image processing device 10 includes an image obtaining unit 70, an annotation target information obtaining unit 72, an annotation information obtaining unit 74, a display position determination unit 76, and a data output unit 78.

The image obtaining unit 70 obtains the image 30 stored in the storage unit 12 or the database 20.

The annotation target information obtaining unit 72 obtains annotation target information indicating an annotation target included in the image 30. In this embodiment, the annotation target information obtaining unit 72 obtains annotation target information indicating an annotation target designated by a user. For example, the annotation target information obtaining unit 72 obtains information indicating a position within the image 30 pointed out by the user on the annotation target designation screen 40 or information indicating a locus inputted by the user on the annotation target designation screen 40, as the annotation target information.

The annotation information obtaining unit 74 obtains annotation information indicating an annotation. In this embodiment, the annotation information obtaining unit 74 obtains annotation information indicating an annotation inputted (or selected) by a user. For example, the annotation information can include information described below:
 text information indicating the annotation;
 information indicating the display color of the annotation;
 information indicating the display size (the letter size) of the annotation; and
 information indicating the writing direction (either horizontal writing or vertical writing) of the annotation.

The display position determination unit 76 determines a display position of the annotation. The display position determination unit 76 determines a display position of the annotation based on the position or area of the annotation target in the image 30. Details on a method for determining a display position of an annotation will be described later (see step S105 or the like in FIG. 7).

The data output unit 78 outputs data on the image 30 with an annotation inputted (or selected) by a user displayed in the display position determined by the display position determination unit 76. For example, the data output unit 78 displays the above described data on the display unit 16. Alternatively, the data output unit 78 outputs (stores) the above described data to the storage unit 12 or the database 20.

Figure 7:
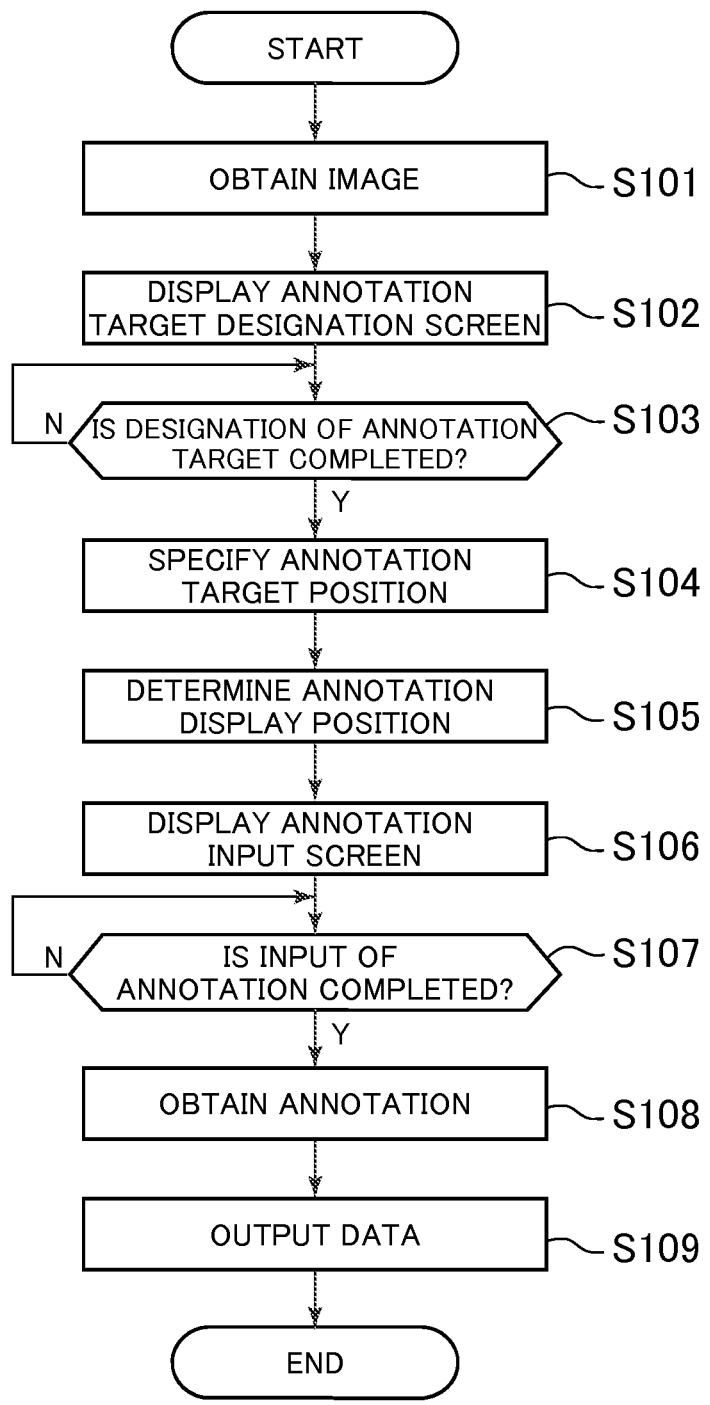
FIG. 7 is a flowchart showing one example of processing that is executed in the image processing device.

In the following, processing that is executed in the image processing device 10 to implement the above described function blocks will be described. FIG. 7 is a flowchart showing one example of processing that is executed in the image processing device 10 to add an annotation to the image 30. The control unit 11 executes the processing shown in FIG. 7 according to the program, thereby functioning as the image obtaining unit 70, the annotation target information obtaining unit 72, the annotation information obtaining unit 74, the display position determination unit 76, and the data output unit 78.

As shown in FIG. 7, initially, the control unit 11 obtains the image 30 from the storage unit 12 or the database 20 (S101). Then, the control unit 11 displays the annotation target designation screen 40 on the display unit 16 (S102). While the annotation target designation screen 40 is displayed, the control unit 11 monitors whether or not designation of an annotation target is completed (S103).

When designation of an annotation target is completed, the control unit 11 specifies a position or an area of the annotation target in the image 30 (S104). For example, the control unit 11 specifies the position or the area of the annotation target based on a position within the image 30 pointed out by the user on the annotation target designation screen 40 or a locus inputted by the user on the annotation target designation screen 40. For example, in the case where the user points out a position within the person 32, the control unit 11 detects the area where the person 32 is displayed by executing publicly known object area detection processing based on the position pointed out by the user, to specify the detected area as the area of the annotation target. Meanwhile, for example, in the case where the user inputs a locus encircling the person 32, the control unit 11 specifies the area encircled by the locus as the area of the annotation target.

Thereafter, the control unit 11 determines a display position of an annotation (S105). Note that although an annotation is not yet inputted by this moment, the display position of an annotation is determined at this moment in this embodiment. That is, in this embodiment, the display position of an annotation is determined prior to input of the annotation.

The display position of an annotation is determined based on at least one of the information items (A) to (H) mentioned below.
(A) the position of the annotation target;
(B) the shape or size of the area of the annotation target:
(C) the length of the annotation;
(D) the display color of the annotation;
(E) the display size of the annotation;
(F) the writing direction of the annotation;
(G) the edge amount of the pixels of the image 30; and
(H) the saliency map of the image 30.

For example, the control unit 11 determines a display position of an annotation based on the position of the annotation target.

Specifically, the control unit 11 determines a position having a distance from the annotation target equal to or shorter than a reference distance as the display position of an annotation. Note here that the "distance from the annotation target" refers to a distance from a representative point of the annotation target or a distance from the boundary of the area of the annotation target.

For example, the control unit 11 determines a display position of an annotation based on the length (the number of letters) and/or the display size (the letter size) of the annotation.

Specifically, when the length of the annotation is long or the display size of the annotation is large, the control unit 11 determines a position within a relatively large free area as the display position of the annotation. For example, in the image 30 shown in FIG. 2, the area between the person 32 and the left side 30L of the image 30 is relatively small, while the area between the person 32 and the upper side 30U of the image 30 is relatively large. Therefore, when the length of the annotation to be associated with the person 32 (the annotation target) is long or the display size of the annotation is large, the control unit 11 determines a position within the area between the person 32 and the upper side 30U of the image 30 as the display position of the annotation.

Meanwhile, when the length of the annotation is short or the display size of the annotation is small, the control unit 11 may determine the display position of the annotation within a relatively small free area. Therefore, when the length of the annotation to be associated with the person 32 (the annotation target) is short or the display size of the annotation is small, the control unit 11 may determine a position within the area between the person 32 and the left side 30L of the image 30 as the display position of the annotation.

For example, the control unit 11 determines a display position of an annotation based on the writing direction of the annotation and the shape or size of the area of the annotation target.

Specifically, when the writing direction of the annotation is "horizontal writing" and the area of the annotation target has a horizontally long shape, the control unit 11 determines a position within the area above or below the annotation target as the display position of the annotation. Alternatively, the control unit 11 may determine a position within the area above or below the annotation target as the display position of the annotation only when the length of the annotation is equal to or shorter than the horizontal length of the area of the annotation target.

Meanwhile, when the writing direction of the annotation is "vertical writing" and the area of the annotation target has a vertically long shape, the control unit 11 determines a position within the area to the left or right of the annotation target as the display position of the annotation. Alternatively, the control unit 11 may determine a position within the area to the left or right of the annotation target as the display position of the annotation only when the length of the annotation is equal to or shorter than the vertical length of the area of the annotation target.

For example, the control unit 11 determines a display position of an annotation based on the display color of the annotation. Specifically, the control unit 11 determines a position within an area having a color that matches well with the display color of the annotation as the display position of the annotation. That is, the control unit 11 looks for an area having a color that matches well with the display color of the annotation, and when such an area is found, determines a position within the area as the display position of the annotation.

In this embodiment, information on a model combination of colors (that is, a combination of colors that match well) is stored in the storage unit 12 or the database 20. With reference to this information, the control unit 11 determines whether or not the display color of the annotation matches well with the color of an area within the image 30. That is, the control unit 11 determines whether or not the combination of the display color of the annotation and the color of the area coincides with any of the combinations indicated by the above described information. When the combination of the display color of the annotation and the color of the area coincides with any of the combinations indicated by the above described information, the control unit 11 determines that the display color of the annotation matches well with the color of the area. Note that the "color of an area" may be the average of the color values of the pixels within the area or the color of the most numerous color pixels within the area.

For example, the control unit 11 determines a display position of an annotation based on the edge amount of each of the pixels in the image 30.

Note here that "edge" refers to an extent of change in color in the image 30, and an "edge amount of a pixel" refers to an amount relevant to a difference in color phase between a pixel and one or more pixels located around the pixel. A publicly known method can be used as a method for calculating an edge amount of a pixel. For example, a Sobel filter can be used. Supposing that the pixel value of a pixel (x, y) is defined as $I_{x,y}$, the edge amount $S_{x,y}$ of the pixel (x, y) is calculated using the expressions (1) to (3) mentioned below.

[Expression 1]

$$S_{x,y\ horz.} = \sum_{i\in\{-1,0,1\}} (I_{x+1,y+i} - I_{x-1,y+i}) \quad (1)$$

$$S_{x,y\ vert.} = \sum_{i\in\{-1,0,1\}} (I_{x+i,y+1} - I_{x+i,y-1}) \quad (2)$$

$$S_{x,y} = \sqrt{S_{x,y\ horz.}^2 + S_{x,y\ vert.}^2} \quad (3)$$

A pixel value I of each pixel is obtained by converting an RGB value of the pixel to a $YC_BC_R$ value. Conversion from an RGB value to a $YC_BC_R$ value is achieved using the expression (4) mentioned below. Here, as an amount relevant to a difference in color phase between a pixel and one or more pixels located around the pixel is used as an "edge amount of a pixel", a pixel value I of each pixel is calculated based on the $C_B$ value and the $C_R$ value of the pixel. For example, a pixel value I of each pixel is calculated using the expression (5) mentioned below.

[Expression 2]

$$\begin{bmatrix} Y \\ C_B \\ C_R \\ 1 \end{bmatrix} = \begin{bmatrix} 65.481 & 128.553 & 24.966 & 16 \\ -37.797 & -74.203 & 112 & 128 \\ 112 & -93.786 & -18.214 & 128 \\ 0 & 0 & 0 & 1 \end{bmatrix} \begin{bmatrix} R \\ G \\ B \\ 1 \end{bmatrix} \quad (4)$$

$$I = \sqrt{C_B^2 + C_R^2} \quad (5)$$

Note that "edge" may refer to an extent of change in brightness in the image 30, and an "edge amount of a pixel" may refer to an amount relevant to a difference in brightness between a pixel and one or more pixels located around the pixel. That is, the Y value of each pixel, calculated using the expression (4) mentioned above, may be used as the pixel value I of the pixel. In other word, the Y value of each pixel may be substituted into the expressions (1) to (3) mentioned above as the pixel value I of the pixel to calculate the edge amount of the pixel.

The control unit 11 determines a position within an area having a total value of the edge amounts of the pixels therein less than a reference value as the display position of the annotation. For example, the control unit 11 looks for an area having a predetermined size and having the total value of the edge amounts of the pixels therein less than the reference value, and when such an area is found, determines a position within the area as the display position of the annotation. Generally, as a large change in color phase or brightness is resulted in a characteristic part (for example, a part showing an object of interest, or the like) of the image 30, it is possible to display the annotation so as not to overlap a characteristic part of the image 30 by determining a position within an area having the total value of the edge amounts less than the reference value as the display position of the annotation.

Alternatively, the control unit 11 may determine a position within an area having a total value of the edge amounts of the pixels therein greater than a reference value as a display position of an annotation. For example, the control unit 11 may look for an area having a predetermined size and having the total value of the edge amounts of the pixels therein greater than the reference value, and when such an area is found, determines a position within the area as the display position of the annotation. In the manner described above, the annotation may be displayed in a characteristic part (an outstanding part) of the image 30.

For example, the control unit 11 may determine a display position of an annotation in consideration of a saliency map of the image 30. Note that the saliency map may be obtained according to a publicly known method.

Specifically, the control unit 11 may determine a position within an area having a saliency lower than a predetermined reference as the display position of the annotation to display the annotation so as not to overlap a characteristic part (a part with saliency) of the image 30. Alternatively, the control unit 11 may determine a position within an area having a saliency higher than a predetermined reference as the display position of the annotation to display the annotation in a characteristic part (a part with saliency) of the image 30.

At step S105, a position that satisfies all or some of the above described conditions is determined as the display position of an annotation. In the processing shown in FIG. 7, the display position of an annotation is determined before an annotation is inputted. Therefore, the display position of an annotation is determined based on an assumption that the length, the display color, the display size, and the writing direction of an annotation are a predetermined length, a predetermined display color, a predetermined display size, and a predetermined writing direction, respectively.

After execution of step S105, the control unit 11 displays the annotation input screen 50 on the display unit 16 (S106). On the annotation input screen 50, the input space 54 is displayed in the display position determined at step S105.

As described above, in the processing shown in FIG. 7, as the display position of an annotation (the display position of the input space 54) is determined before the annotation is inputted, the display position of the input space 54 (the display position of an annotation) is determined based on an assumption that the length (the number of letters), the display color, the display size, and the writing direction of an annotation are a predetermined length (the number of letters), a predetermined display color, a predetermined display size, and a predetermined writing direction, respectively.

In view of the above, when a number of the letters have been inputted in the input space 54 is greater than a predetermined number while the annotation input screen 50 is displayed, the display position of the input space 54 (the display position of an annotation) is determined again based on the number of letters inputted in the input space 54.

Further, also in the case where a color that is different from the predetermined display color is designated as the display color of the annotation, the display position of the input space 54 (the display position of an annotation) may be determined again. Similarly, also in the case where a display size that is different from the predetermined display size is designated as the display size of the annotation or where a writing direction that is different from the predetermined writing direction is designated as the writing direction of the annotation, the display position of the input space 54 (the display position of an annotation) may be determined again.

As described above, the display position of the input space 54 (the display position of an annotation) may be determined again in accordance with the content of designation by a user to change the display position of the input space 54 (the display position of an annotation).

While the annotation input screen 50 is displayed, the control unit 11 monitors whether or not input of an annotation is completed (S107). That is, the control unit 11 monitors whether or not the register button 56 is clicked.

When input of an annotation is completed, the control unit 11 obtains the annotation inputted in the input space 54 on the annotation input screen 50 (S108). Then, the control unit 11 generates data on the image 30 with the annotation obtained at step S108 displayed in the display position determined at step S105, and outputs the generated data (S109). For example, the control unit 11 displays the data on the display unit 16. Alternatively, the control unit 11 stores the data in the storage unit 12 or the database 20.

According to the image processing device 10 according to the first embodiment described above, it is possible to display an annotation in the optimum position that is determined in consideration of the annotation and the annotation target.

Figure 8:
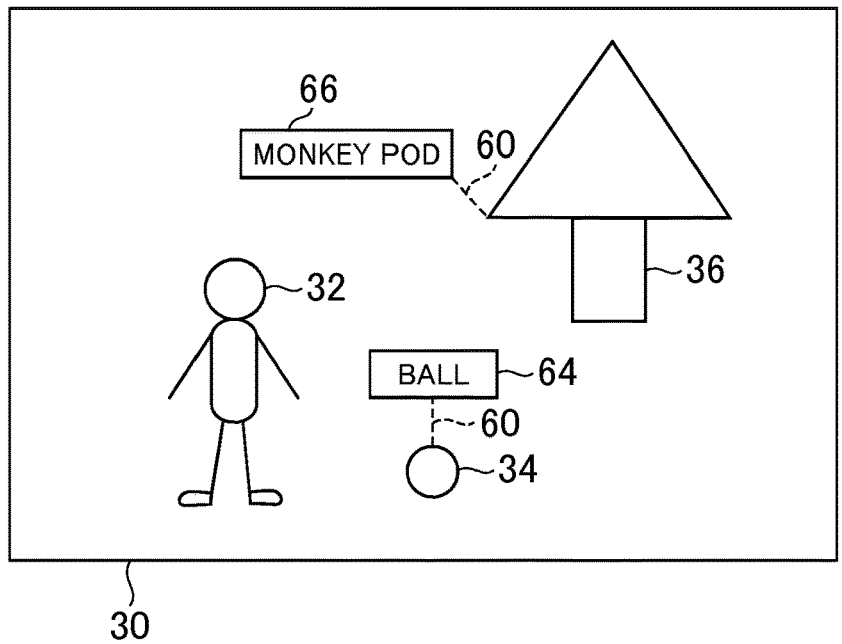
FIG. 8 shows one example of an image to which another annotation is already added.

Note that although it has been described in the above that an annotation is added to the image 30 that has no annotation added thereto, there is also a case where another annotation is already added to the image 30. FIG. 8 shows one example of the image 30 to which another annotation is already added. In the image 30 shown in FIG. 8, the annotation 64 is associated with the ball 34 (the annotation target), and the annotation 66 is associated with the tree 36 (the annotation target).

Figure 9:
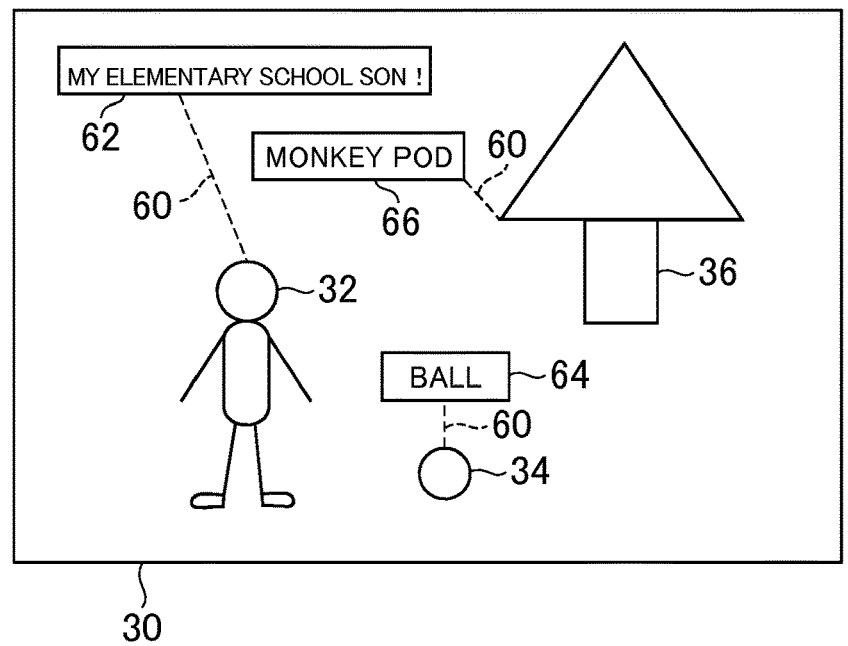
FIG. 9 shows another example of the image to which an annotation is added.
Figure 10:
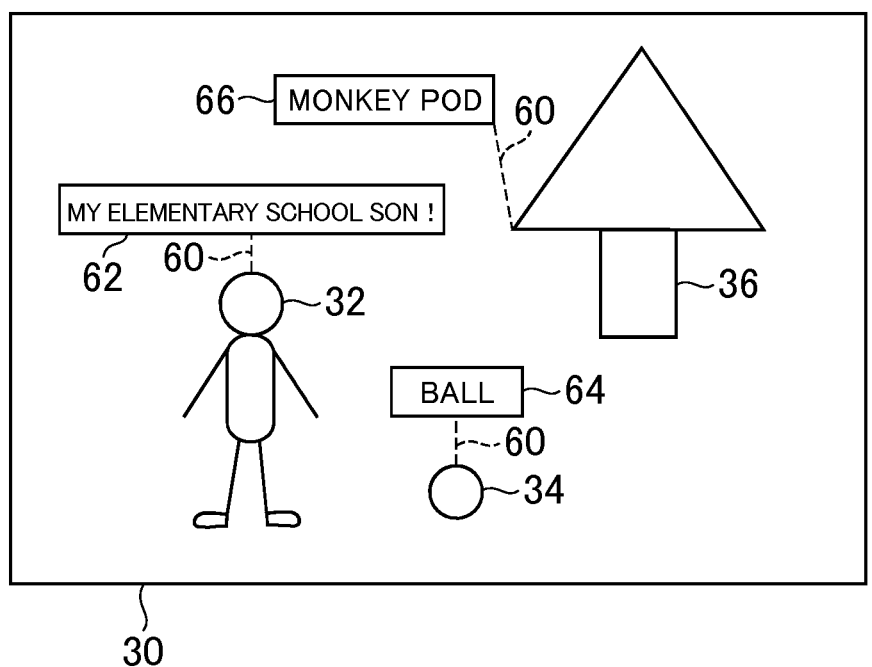
FIG. 10 shows still another example of the image to which an annotation is added.

Below, a method for determining a display position of an annotation to be newly added to the image 30 to which another annotation is already added will be described. FIGS. 9 and 10 explain a method for determining a display position of an annotation 62 to be newly added to the image 30 to which other annotations 64, 66 are already added.

In the case where the other annotations 64, 66 are already added to the image 30, the control unit 11 determines a display position of the annotation 62 to be newly added, at step S105 in FIG. 7 as to be described below.

In this case, the display position of the annotation 62 is determined based on at least one of the above described information items (A) to (H) and at least one of the information items (I) to (K) mentioned below:

(I) the display positions of the respective other annotations 64, 66;

(J) the positions of the annotation targets (the ball 34, the tree 36) corresponding to the respective other annotations 64, 66; and (K) the shape or size of the areas of the annotation targets (the ball 34, the tree 36) corresponding to the respective other annotations 64, 66.

For example, the control unit 11 determines the display position of the annotation 62 based on the display positions of the respective other annotations 64, 66. Specifically, the control unit 11 determines a position that leaves the annotation 62 not overlapping the other annotations 64, 66 as the display position of the annotation 62. Alternatively, the control unit 11 determines a position having distances from the display positions of the respective other annotations 64, 66 longer than a reference distance as the display position of the annotation 62. The example shown in FIG. 9 relates to a case where the display position of the annotation 62 is determined as described above.

For example, the control unit 11 determines the display position of the annotation 62 based on the positions or the areas of the annotation targets (the ball 34, the tree 36) corresponding to the respective other annotations 64, 66. Specifically, the control unit 11 determines a position having distances from the annotation targets (the ball 34, the tree 36) corresponding to the respective other annotations 64, 66 longer than a reference distance as the display position of the annotation 62.

Note that the control unit 11 may determine the display position of the annotation 62 without considering the other annotations 64, 66 at step S105 in FIG. 7, and may change the display positions of the other annotations 64, 66, based on the display position of the annotation 62. In the example shown in FIG. 10, as the display area of the annotation 62 overlaps the original display area of the annotation 66 (see FIG. 8), the display position of the annotation 66 is changed to a position that does not overlap the annotation 62. In other words, the display position of the annotation 66 is changed to a position having a distance from the annotation 62 longer than a reference distance.

Alternatively, the control unit 11 may obtain a plurality of kinds of combinations of the display positions of the annotations 62, 64, 66 at step S105 in FIG. 7. Further, the control unit 11 may calculate an evaluation value of each of the combinations, and select any combination based on the evaluation value to determine the display positions of the respective annotations 62, 64, 66, based on the selected combination.

Note that the respective display positions of the annotations 62, 64, 66 are determined based on at least one of the above described information items (A) to (H) in this case. The evaluation value of the combination is calculated based on at least one of the indexes mentioned below, for example:

the distance between the annotation and the annotation target (a shorter distance results in a higher evaluation);

the distance between the annotation and another annotation (a longer distance results in a higher evaluation);

how well the display color of the annotation matches with the color of the display position of the annotation (better matching results in a higher evaluation);

the edge amount of the display position of the annotation (a smaller edge amount results in a higher evaluation); and the saliency of the display position of the annotation (a lower saliency results in a higher evaluation).

Second Embodiment

A second embodiment of the present invention will be described. The image processing device 10 according to the second embodiment is similar to that in the first embodiment except the point described below.

While a display position of an annotation is determined before an annotation is inputted (in other words, before the annotation input screen 50 is displayed) in the image processing device 10 according to the first embodiment (see step S105 in FIG. 7), a display position of an annotation is determined after an annotation is inputted in the image processing device 10 according to the second embodiment. Regarding this point, the image processing device 10 according to the second embodiment differs from that in the first embodiment.

Figure 11:
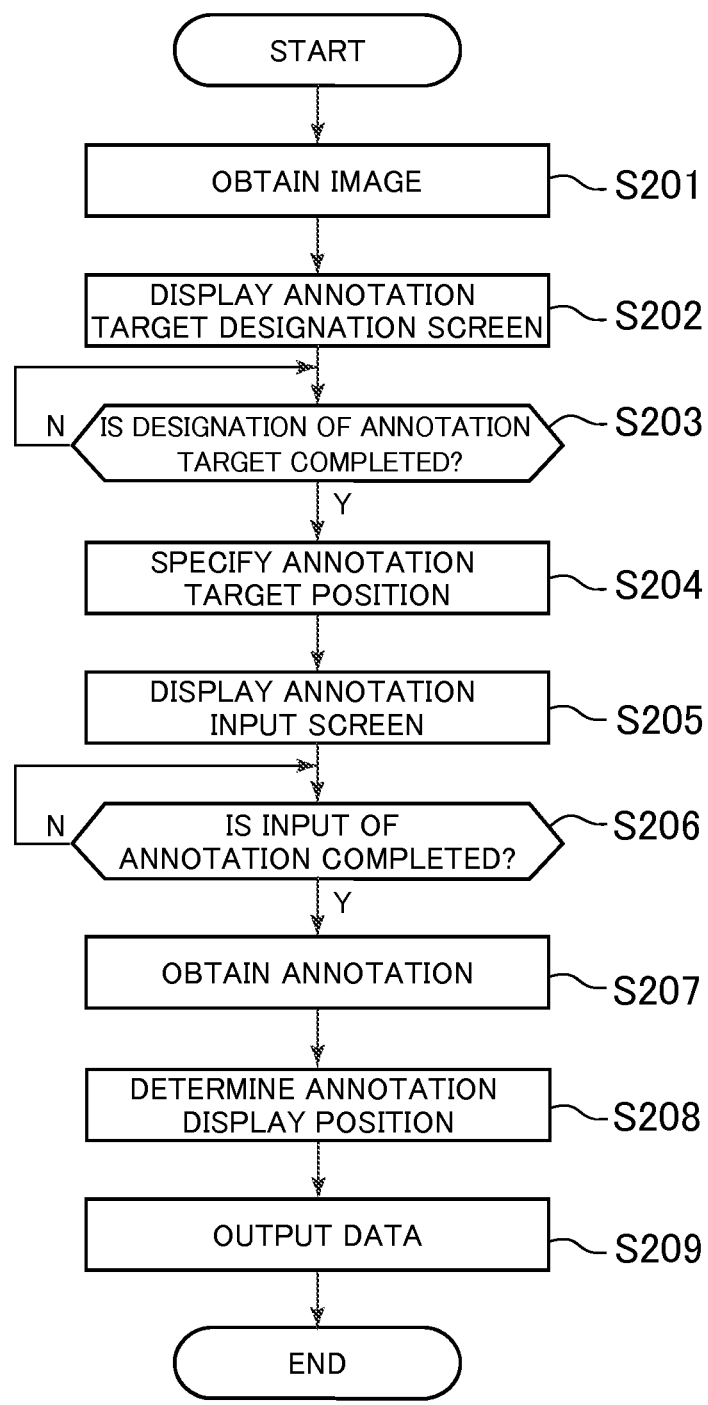
FIG. 11 is a flowchart showing another example of the processing that is executed in the image processing device.

Processing that is executed in the image processing device 10 according to the second embodiment will be described. FIG. 11 is a flowchart showing one example of processing that is executed in the image processing device 10 according to the second embodiment. In the image processing device 10 according to the second embodiment, the processing shown in FIG. 11 is executed instead of the processing shown in FIG. 7.

Steps S201 to S204 in FIG. 11 are similar to steps S101 to S104 in FIG. 7, and thus not described here.

Figure 12:
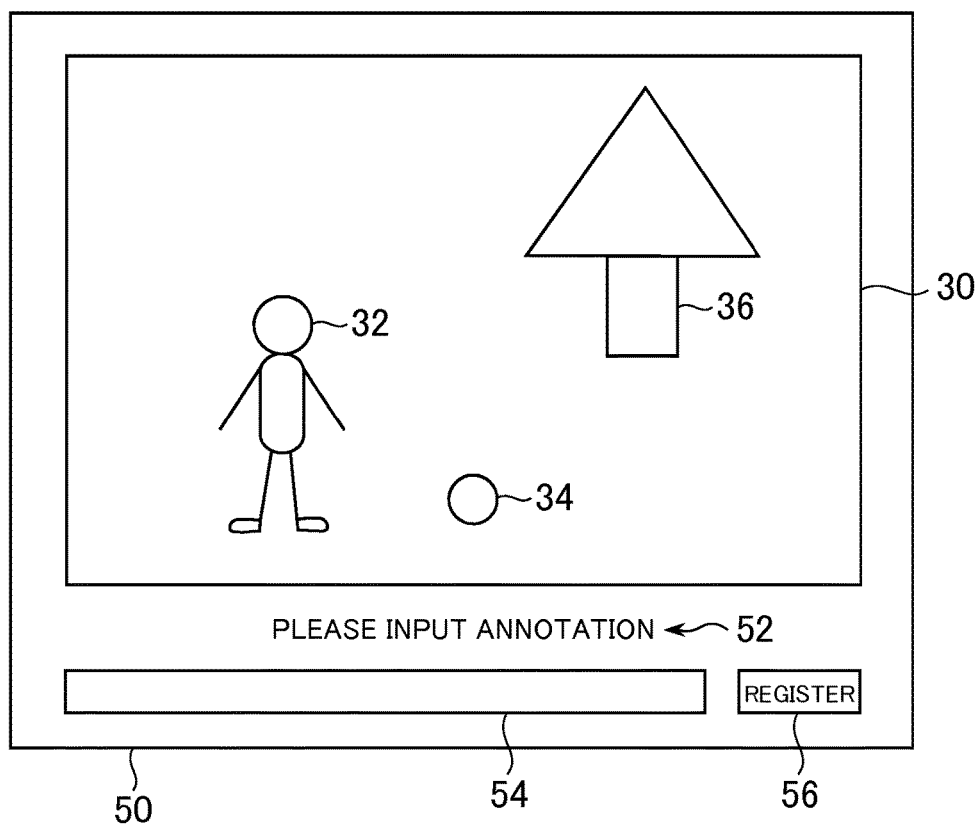
FIG. 12 shows another example of the annotation input screen.

After execution of the processing at step S204, the control unit 11 displays the annotation input screen 50 on the display unit 16 (S205). FIG. 12 shows one example of the annotation input screen 50 displayed at step S205. The annotation input screen 50 shown in FIG. 12 differs from the annotation input screen 50 shown in FIG. 4 in that the input space 54 is displayed in a predetermined position outside the image 30.

While the annotation input screen 50 is displayed, the control unit 11 monitors whether or not input of an annotation is completed (S206). Step S206 is similar to step S107 in FIG. 7.

When input of an annotation is completed, the control unit 11 obtains the annotation inputted in the input space 54 on the annotation input screen 50 (S207). Then, the control unit 11 determines a display position of the annotation obtained at step S207 (S208). Basically, the processing executed at step S208 is similar to that at step S105 in FIG. 7. However, different from step S105, as the annotation is already inputted by the time of execution of step S208, the display position of the annotation is determined based on at least one of the length, the display color, the display size, and the writing direction of the annotation that are actually inputted.

After execution of the processing at step S208, the control unit 11 outputs data on the image 30 with the annotation obtained at step S207 displayed in the display position determined at step S208 (S209). For example, the control unit 11 displays the data on the display unit 16. Alternatively, the control unit 11 stores the data in the storage unit 12 or the database 20.

Note that although steps S207 and S208 are executed after completion of input of an annotation in the processing shown in FIG. 11, steps S207 and S208 may be executed while an annotation is being inputted. That is, steps S207 and S208 may be executed every input of a letter into the input space 54 on the annotation input screen 50, based on the annotation already inputted by then (that is, the annotation in the midst of being inputted).

According to the image processing device 10 according to the second embodiment described above, similar to the image processing device 10 according to the first embodiment, it is possible to display an annotation in the optimum position determined in consideration of the annotation and the annotation target.

Note that in the image processing device 10 according to the second embodiment as well, there is a case where another annotation is already added to the image 30 (see FIG. 8). In such a case, a display position of an annotation may be determined based on at least one of the above mentioned information items (A) to (K) at step S208 in FIG. 11 (see FIGS. 9 and 10).

Third Embodiment

A third embodiment of the present invention will be described. The image processing device 10 according to the third embodiment is similar to that in the first embodiment except the point described below.

In the image processing device 10 according to the third embodiment, a plurality of display position candidates of an annotation are obtained before completion of input of an annotation, and any of the plurality of display position candidates is selected as the display position of an annotation after completion of input of the annotation. Regarding this point, the image processing device 10 according to the third embodiment differs from that in the first embodiment.

In the image processing device 10 according to the third embodiment, a plurality of kinds (classification) of annotation types are determined in advance. FIGS. 13A, 13B, 13C, 13D show examples of an annotation type. In FIGS. 13A to 13D, a plurality of kinds of types are defined, and a characteristic of an annotation belonging to each type is described.

In the example shown in FIG. 13A, an annotation type is set based on the length (the number of letters) of an annotation. That is, the "first type" in FIG. 13A is a type to which an annotation having a length of five or fewer letters belongs. The "second type" is a type to which an annotation having a length of six to ten letters belong. The "third type" is a type to which an annotation having a length of eleven or more letters belong.

In the example shown in FIG. 13B, an annotation type is set based on the display color of an annotation. The "first type" in FIG. 13B is a type to which an annotation having a black display color belongs. The "second type" is a type to which an annotation having a red display color belongs. The "third type" is a type to which an annotation having a blue display color belongs.

In the example shown in FIG. 13C, an annotation type is set based on the display size of an annotation. The "first type" in FIG. 13C is a type to which an annotation having a display size less than P1 belongs. The "second type" is a type to which an annotation having a display size equal to or greater than P1 and less than P2 belongs. The "third type" is a type to which an annotation having a display size equal to or greater than P2 belongs. Note that "P1" and "P2" indicate respective predetermined display sizes (a letter size).

In the example shown in FIG. 13D, an annotation type is set based on the writing direction of an annotation. The "first type" in FIG. 13D is a type to which an annotation in horizontal writing belongs. The "second type" is a type to which an annotation in vertical writing belongs.

Alternatively, an annotation type (classification) may be set based on two or more of the length, the display color, the display size, and the writing direction of an annotation. That is, a type resulting from combination of two or more of the types shown in FIGS. 13A to 13D may be set.

Processing that is executed in the image processing device 10 according to the third embodiment will be described. FIG. 14 is a flowchart showing one example of processing that is executed in the image processing device 10 according to the third embodiment. In the image processing device 10 according to the third embodiment, the processing shown in FIG. 14 is executed instead of the processing shown in FIG. 7. Note that the processing shown in FIG. 14 is described below based on an assumption that the types shown in FIG. 13A are defined.

Steps S301 to S304 in FIG. 14 are similar to steps S101 to S104 in FIG. 7, and thus not described here.

Figure 15:
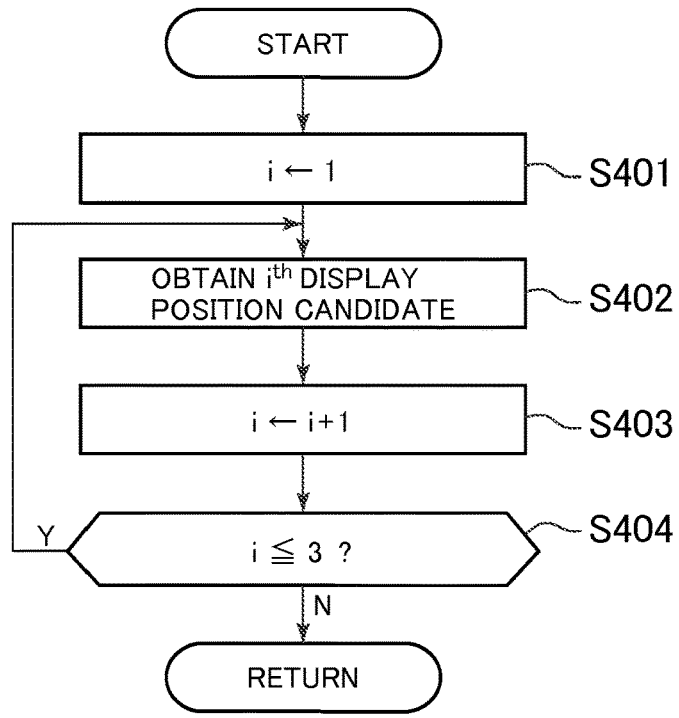
FIG. 15 is a flowchart showing still another example of the processing that is executed in the image processing device.

After execution of step S304, the control unit 11 obtains a display position candidate of an annotation to be added to the annotation target (S305). FIG. 15 shows one example of the processing executed at step S305.

As shown in FIG. 15, initially, the control unit 11 initializes the variable i to one (S401). Then, the control unit 11 obtains the $i^{th}$ display position candidate (S402). For example, the control unit 11 determines a display position of an annotation to be added to the annotation target, based on an assumption that the annotation belongs to the $i^{th}$ type. Processing for determining a display position of an annotation is similar to that at step S105 in FIG. 7 or step S208 in FIG. 11. Then, the control unit 11 obtains the above mentioned display position as the display position candidate corresponding to the $i^{th}$ type (that is, the $i^{th}$ display position candidate).

For example, when the variable i is one, the control unit 11 determines a display position of an annotation to be added to the annotation target, based on an assumption that the length of the annotation is an annotation of five or fewer letters, and obtains the determined display position as the first display position candidate.

After execution of step S402, the control unit 11 stores the $i^{th}$ display position candidate obtained at step S402 in the storage unit 12. Thereafter, the control unit 11 adds one to the variable i (S403), and determines whether or not the variable i is equal to or less than three (S404). Note here that "three" is the total number of the kinds of the annotation type (see FIG. 13A).

In the case where the variable i after addition at step S403 is three or less, the control unit 11 obtains the $i^{th}$ display position candidate (S402). For example, when the variable i indicates two, the control unit 11 determines a display position of the annotation to be added to the annotation target, based on an assumption that the length of the annotation is of six to ten letters, and obtains the determined display position as the second display position candidate. For example, when the variable i is three, the control unit 11 determines a display position of the annotation to be added to the annotation target, based on an assumption that the length of the annotation is of eleven or more letters, and obtains the determined display position as the third display position candidate. Meanwhile, when the variable i is not equal to or less than three, the control unit 11 ends this processing.

Figure 16:
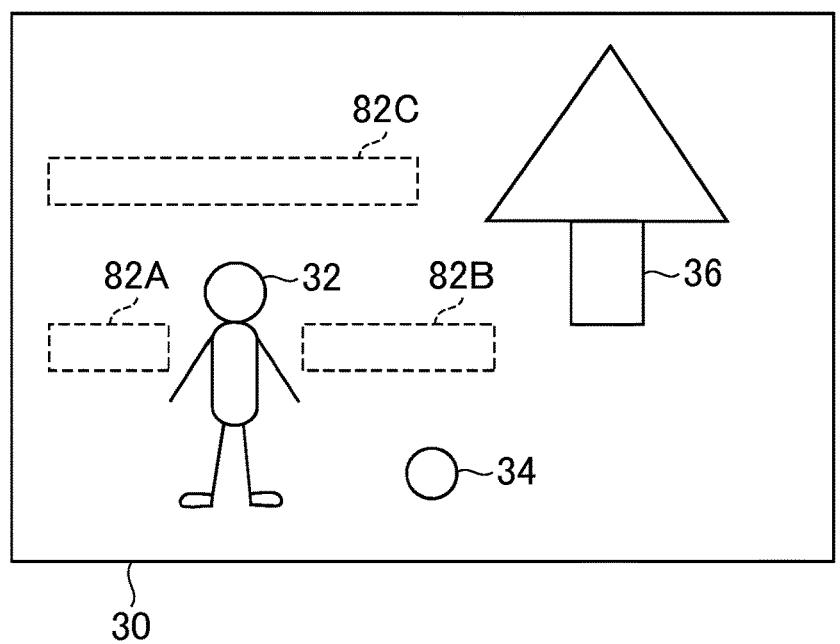
FIG. 16 shows one example of a display position candidate.

By the time when the processing shown in FIG. 15 ends, the first to third display position candidates have been obtained. FIG. 16 shows one example of the first to third display position candidates. In FIG. 16, the display position candidate 82A indicates the first display position candidate, the display position candidate 82B indicates the second display position candidate, and the display position candidate 82C indicates the third display position candidate.

For example, the display position candidate 82A is a display position candidate obtained based on an assumption that an annotation belongs to the first type. As the first type is a type to which an annotation having a short length belongs (see FIG. 13A), the display position candidate 82A is a display position candidate that is obtained based on an assumption that the length of the annotation is short. Thus, the display position candidate 82A is set in a relatively small free area.

Further, for example, the display position candidate 82C is a display position candidate obtained based on an assumption that an annotation belongs to the third type. As the third type is a type to which an annotation having a long length belongs, the display position candidate 82C is a display position candidate that is obtained based on an assumption that the length of the annotation is long. Thus, the display position candidate 82C is set in a relatively large free area.

When the processing shown in FIG. 15 (that is, step S305 in FIG. 14) is completed, the control unit 11 displays the annotation input screen 50 on the display unit 16, as shown in FIG. 14 (S306). For example, the control unit 11 displays the annotation input screen 50, such as is shown in FIG. 12, on the display unit 16.

While the annotation input screen 50 is displayed, the control unit 11 monitors whether or not input of an annotation is completed (S307). Step S307 is similar to step S107 in FIG. 7.

Figure 17:
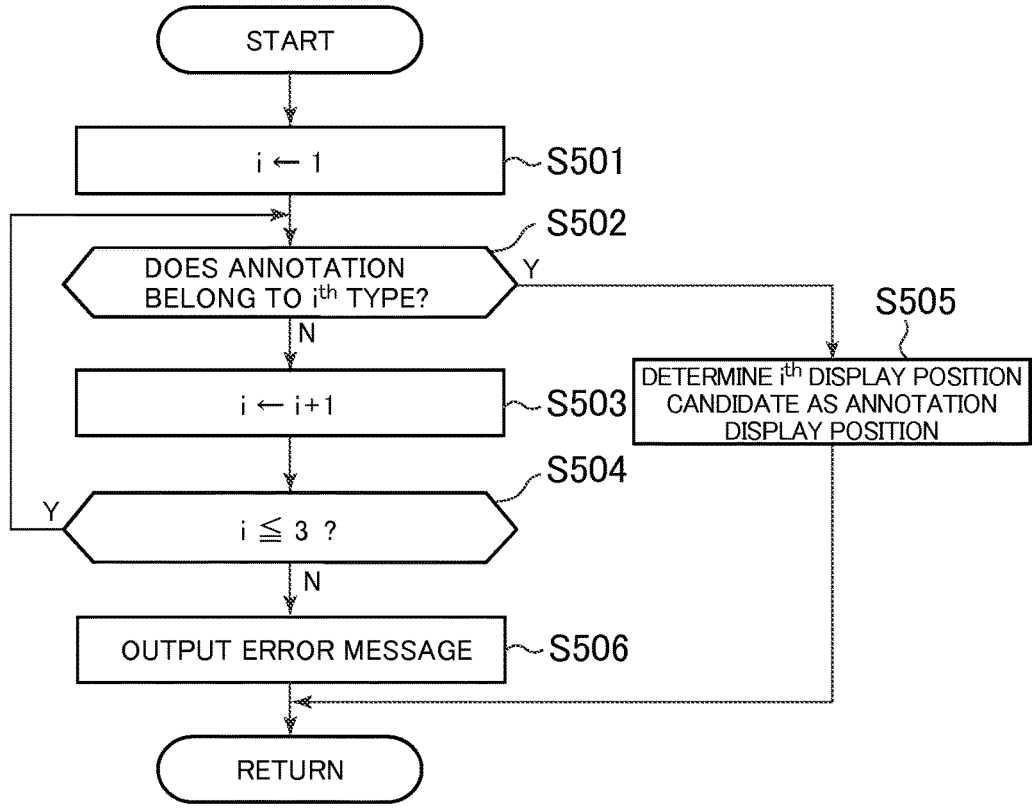
FIG. 17 is a flowchart showing still another example of the processing that is executed in the image processing device.

When input of an annotation is completed, the control unit 11 obtains the annotation inputted in the input space 54 on the annotation input screen 50 (S308). Then, the control unit 11 determines a display position of the annotation obtained at step S308 (S309). FIG. 17 is a flowchart showing one example of processing executed at step S309 in FIG. 17.

As shown in FIG. 17, initially, the control unit 11 initializes the variable i to one (S501). Then, the control unit 11 determines whether or not the annotation obtained at step S308 belongs to the $i^{th}$ type (S502). For example, when the variable i indicates one, the control unit 11 determines whether or not the length (the number of letters) of the annotation obtained at step S308 is of five or fewer letters. When the length of the annotation obtained at step S308 is of five or fewer letters, the control unit 11 determines that the annotation obtained at step S308 belongs to the first type.

When the annotation obtained at step S308 does not belong to the $i^{th}$ type, the control unit 11 adds one to the variable i (S503), and determines whether or not the variable i indicates three or less (S504). Note that "three" is the total number of the kinds of the annotation type.

When it is determined that the variable i indicates three or less, the control unit 11 executes again step S502. Note that a case where it is determined that the variable i is not equal to three or less refers to a case where the annotation obtained at step S308 belongs to none of the first to third types. In this case, the control unit 11 displays an error message on the display unit 16 (S506) to end this processing. In this case, the control unit 11 ends the processing shown in FIG. 14 without executing step S310 to be described later. Note that in the case where the first to third types are set such that an annotation belongs to any of the first to third types without fail, step S506 is unnecessary.

When it is determined at step S502 that the annotation obtained at step S308 belongs to the $i^{th}$ type, the control unit 11 determines a display position of the annotation obtained at step S308, based on the $i^{th}$ display position candidate. That is, the control unit 11 determines the $i^{th}$ display position candidate as the display position of the annotation obtained at step S308 (S505). Then, the control unit 11 ends this processing, and executes step S310 in FIG. 14.

When step S309 (that is, the processing shown in FIG. 17) is completed, the control unit 11 outputs data on the image 30 with the annotation obtained at step S308 displayed in the display position determined at step S309 (S310). For example, the control unit 11 displays the data on the display unit 16. Alternatively, the control unit 11 stores the data in the storage unit 12 or the database 20.

According to the image processing device 10 according to the third embodiment described above, it is possible to display an annotation in the optimum position determined in consideration of the annotation and the annotation target, similar to the image processing device 10 according to the first embodiment.

In the image processing device 10 according to the third embodiment as well, there is a case where another annotation is already added to the image 30 (see FIG. 8). In the case where another annotation is already added to the image 30, processing such as is be described below is executed at step S402 in FIG. 15. Note here that a case is assumed here in which an annotation (the annotation 62 in FIGS. 9, 10) is newly added to an image 30 to which other annotations 64, 66 are already added.

At step S402, the control unit 11 obtains a display position candidate combination corresponding to the $i^{th}$ type (an $i^{th}$ display position candidate combination).

For example, when the variable i indicates one, the control unit 11 obtains a display position candidate combination corresponding to the first type (a first display position candidate combination). That is, the control unit 11 obtains a combination of the display position candidate of an annotation to be newly added and the display position candidates of the other annotations 64, 66 already added, assuming a case where the annotation to be newly added belongs to the first type.

Figure 18:
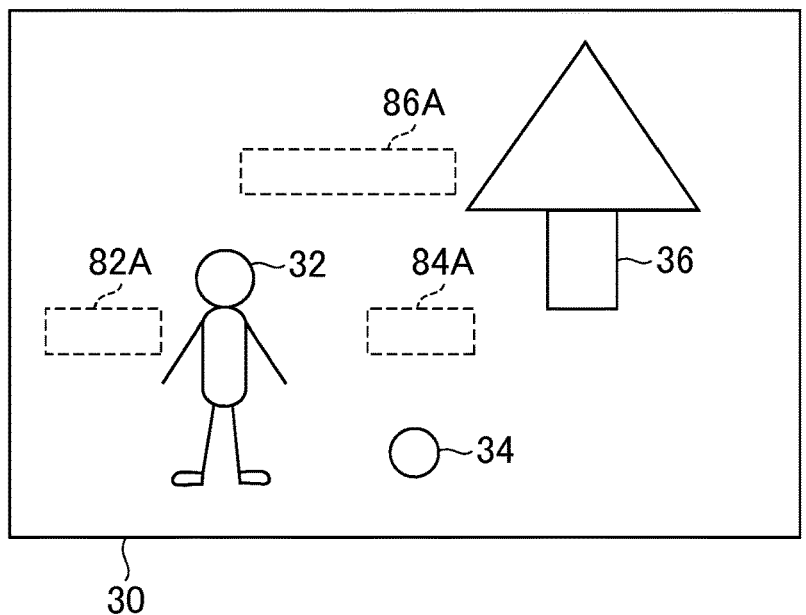
FIG. 18 shows one example of the display position candidate.

FIG. 18 shows one example of the first display position candidate combination. In FIG. 18, the display position candidate 82A indicates the first display position candidate of an annotation to be newly added. The display position candidate 84A indicates the first display position candidate of the annotation 64 already added to the ball 34, and the display position candidate 86A indicates the first display position candidate of the annotation 66 already added to the tree 36.

For example, the control unit 11 determines a display position of an annotation to be newly added, based on an assumption that the annotation belongs to the first type, and obtains the determined display position as the display position candidate 82A of the annotation to be newly added. As the first type is a type to which an annotation of five or fewer letters belongs (see FIG. 13A), the display position candidate 82A is a display position candidate obtained based on an assumption that the annotation to be newly added is an annotation of five or fewer letters.

After obtaining the display position candidate 82A, the control unit 11 obtains the display position candidate 84A of the annotation 64 based on the display position candidate 82A. As the original display area of the annotation 64 (see FIG. 8) does not overlap the display position candidate 82A, the control unit 11 obtains the original display position of the annotation 64, for example, as the display position candidate 84A.

After obtaining the display position candidates 82A, 84A, the control unit 11 obtains the display position candidate 86A of the annotation 66 based on the display position candidates 82A, 84A. As the original display area of the annotation 66 (see FIG. 8) does not overlap the display position candidates 82A, 84A, the control unit 11 obtains the original display position of the annotation 66, for example, as the display position candidate 86A.

When the variable i indicates two, for example, the control unit 11 obtains a display position candidate combination corresponding to the second type (a second display position candidate combination). That is, the control unit 11 obtains a combination of the display position candidate of an annotation to be newly added and the display position candidates of the other annotations 64, 66 already added, based on an assumption that the annotation to be newly added belongs to the second type.

Figure 19:
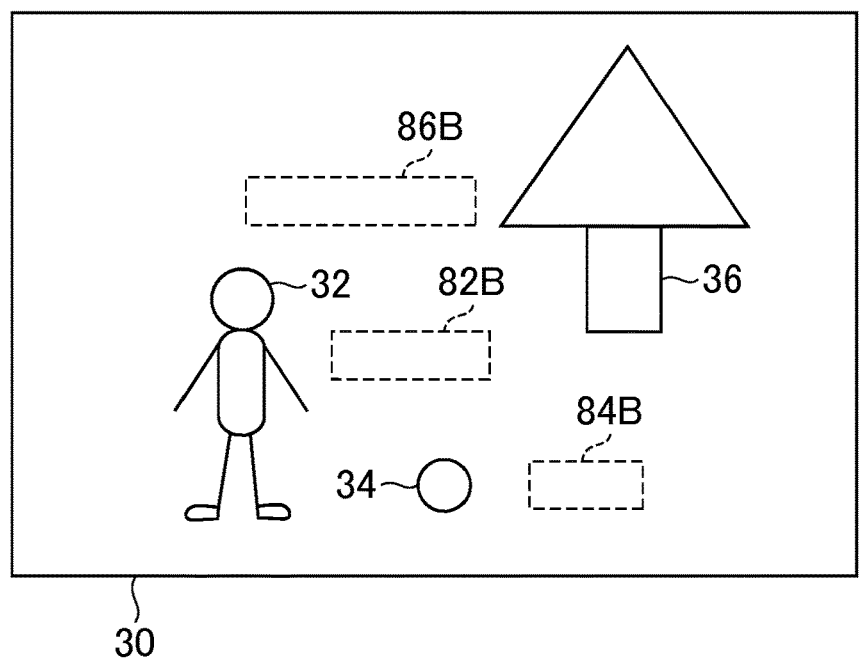
FIG. 19 shows one example of the display position candidate.

FIG. 19 shows one example of the second display position candidate combination. In FIG. 19, the display position candidate 82B indicates the second display position candidate of an annotation to be newly added. The display position candidate 84B indicates the second display position candidate of the annotation 64 already added to the ball 34, and the display position candidate 86B indicates the second display position candidate of the annotation 66 already added to the tree 36.

For example, the control unit 11 determines a display position of an annotation to be newly added, based on an assumption that the annotation belongs to the second type, and obtains the determined display position as the display position candidate 82B of the annotation to be newly added. As the second type is a type to which an annotation of six to ten letters belongs, the display position candidate 82B is a display position candidate obtained based on an assumption that the annotation to be newly added is an annotation of six to ten letters.

After obtaining the display position candidate 82B, the control unit 11 obtains the display position candidate 84B of the annotation 64 based on the display position candidate 82B. As the original display area of the annotation 64 (see FIG. 8) overlaps the display position candidate 82B, the control unit 11 obtains a position different from the original display position of the annotation 64, for example, as the display position candidate 84B. That is, the control unit 11 obtains a position not overlapping the display position candidate 82B as the display position candidate 84B.

After obtaining the display position candidates 82B, 84B, the control unit 11 obtains the display position candidate 86B of the annotation 66 based on the display position candidates 82B, 84B. As the original display area of the annotation 66 (see FIG. 8) does not overlap the display position candidates 82B, 84B, the control unit 11 obtains the original display position of the annotation 66, for example, as the display position candidate 86B.

For example, when the variable i indicates three, the control unit 11 obtains a display position candidate combination corresponding to the third type (a third display position candidate combination). That is, the control unit 11 obtains a combination of the display position candidate of an annotation to be newly added and the display position candidates of the other annotations 64, 66 already added, based on an assumption that the annotation to be newly added belongs to the third type.

Figure 20:
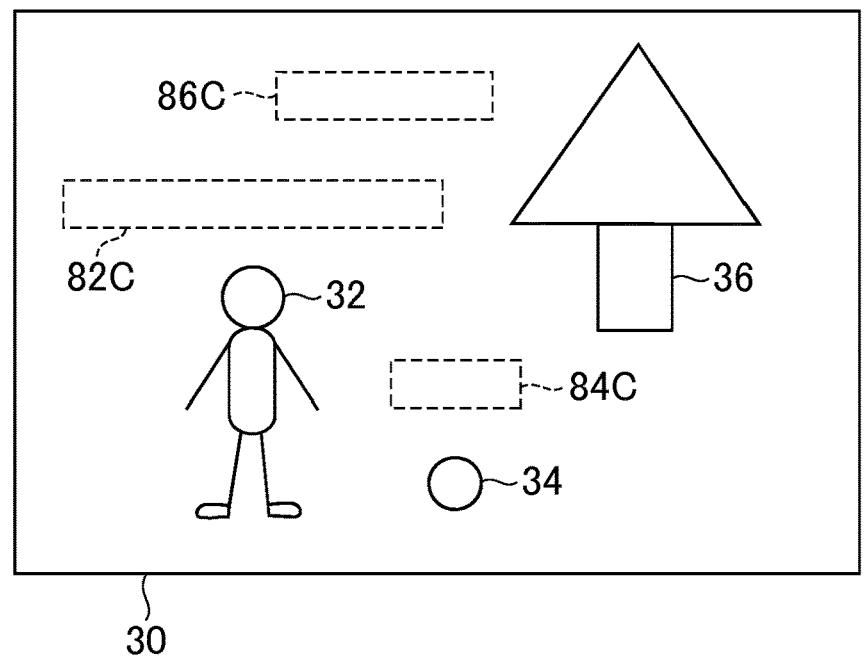
FIG. 20 shows one example of the display position candidate.

FIG. 20 shows one example of the third display position candidate combination. In FIG. 20, the display position candidate 82C indicates the third display position candidate of an annotation to be newly added. The display position candidate 84C indicates the third display position candidate of the annotation 64 already added to the ball 34, and the display position candidate 86C indicates the third display position candidate of the annotation 66 already added to the tree 36.

For example, the control unit 11 determines a display position of an annotation to be newly added, based on an assumption that the annotation belongs to the third type, and obtains the determined display position as the display position candidate 82C of the annotation to be newly added. As the third type is a type to which an annotation of eleven or more letters belongs, the display position candidate 82C is a display position candidate obtained based on an assumption that an annotation to be newly added is an annotation of eleven or more letters.

After obtaining the display position candidate 82C, the control unit 11 obtains the display position candidate 84C of the annotation 64 based on the display position candidate 82C. As the original display area of the annotation 64 (see FIG. 8) does not overlap the display position candidate 82C, the control unit 11 obtains the original display position of the annotation 64, for example, as the display position candidate 84C.

After obtaining the display position candidates 82C, 84C, the control unit 11 obtains the display position candidate 86C of the annotation 66 based on the display position candidates 82C, 84C. As the original display area of the annotation 66 (see FIG. 8) overlaps the display position candidate 82C, the control unit 11 obtains a position different from the original display position of the annotation 66, for example, as the display position candidate 86C. That is, the control unit 11 obtains a position not overlapping the display position candidate 82C as the display position candidate 86C.

In the case where another annotation is already added to the image 30, processing such as is described below will be executed at step S505 in FIG. 17. Assume here again that an annotation (the annotation 62 in FIGS. 9 and 10) is newly added to the image 30 to which the other annotations 64, 66 are already added.

That is, the control unit 11 determines a display position of an annotation to be newly added and the display positions of the other annotations 64, 66 already added, based on the $i^{th}$ display position candidate combination.

For example, when the variable i indicates three and it is determined at step S502 that the annotation obtained at step S308 belongs to the third type, the control unit 11 determines the display position of the annotation obtained at step S308 and the display positions of the other annotations 64, 66 already added, based on the third display position candidate combination (see FIG. 20).

Specifically, the control unit 11 determines the display position candidate 82C as the display position of the annotation obtained at step S308. Similarly, the control unit 11 determines the display position candidate 84C as the display position of the annotation 64. Further, the control unit 11 determines the display position candidate 86C as the display position of the annotation 66. As a result, data on the image 30 such as is shown in FIG. 10 is outputted at step S310 in FIG. 14.

Note that the present invention is not limited to the above described first to third embodiments.

For example, the image processing device 10 may execute in advance processing such as is to be described below.

That is, the control unit 11 specifies in advance an annotation target candidate included in the image 30. Note here that an "annotation target candidate" refers to an object that can be designated as an annotation target by a user. Note that a publicly known method can be used as a method for specifying an annotation target candidate.

For example, an object area included in the image 30 may be specified through an algorithm for specifying an object area, and the object area may be determined as an annotation target candidate.

For example, a face area included in the image 30 may be specified through an algorithm for recognizing a face, and the face area may be determined as an annotation target candidate.

For example, an annotation target candidate may be specified based on the edge amount of a pixel of the image 30. Specifically, an area having a predetermined size and having a total value of the edge amounts of the pixels therein higher than a reference value may be looked for, and when such an area is found, the area may be specified as an annotation target candidate.

For example, an annotation target candidate may be specified based on a saliency map of the image 30. Specifically, an area having a saliency higher than a predetermined reference may be looked for, and when such an area is found, the area may be specified as an annotation target candidate.

When an annotation target candidate is specified as described above, the control unit 11 determines a display position of an annotation, assuming a case where the annotation target candidate is designated as the annotation target and an annotation for the annotation target is inputted. In this case, the display position of the annotation is determined based on an assumption that the length, the display color, the display size, and the writing direction of the annotation are a predetermined length, a predetermined display color, a predetermined display size, and a predetermined writing direction, respectively.

The display position determined as described above is stored in the storage unit 12 or the database 20 so as to be associated with the annotation target candidate, and used at step S105 in FIG. 7, for example.

For example, at step S105 in FIG. 7, the control unit 11 determines whether or not the annotation target designated by a user corresponds to the annotation target candidate determined in advance. When the annotation target designated by the user corresponds to the annotation target candidate determined in advance, the control unit 11 determines a display position of an annotation based on the display position stored so as to be associated with the annotation target candidate. For example, the control unit 11 determines the display position stored so as to be associated with the annotation target candidate as the display position of the annotation.

The invention claimed is:

1. An image processing device, comprising:
    a processor; and
    a memory device that stores a plurality of instructions,
    wherein when the processor executes the instructions in the memory device, the processor is operable to:
    obtain annotation target information for indicating an annotation target to which to add an annotation, the annotation target being included in an image;
    obtain annotation information indicating an annotation; and
    determine a display position of the annotation based on a position or an area of the annotation target,
    wherein the processor is operable to:
    where a plurality of annotations are added to the image, obtain a plurality of kinds of combinations of display positions of the plurality of annotations, the display positions of the plurality of annotations in each of the combinations being obtained based on the position or the area of the annotation target;
    calculate an evaluation value of each of the combinations based on the display positions of the plurality of annotations in each of the combinations; and
    determine the display positions of the plurality of annotations based on a combination selected from among the combinations based on the evaluation value of each of the combinations,
    wherein the plurality of annotations comprise a first annotation corresponding to a first annotation target, and
    the processor is operable to:
    obtain a plurality of display position candidates of the first annotation based on at least one of:
        the display positions of other annotations of the plurality of annotations,
        the positions of the annotation targets corresponding to the other annotations of the plurality of annotations, or
        the shape or size of the areas of the annotation targets corresponding to the other annotations of the plurality of annotations;
    wherein the processor is operable to:
    receive designation of the annotation target from a user; and
    receive, from the user, designation of the annotation which corresponds to the annotation target designated by the user,
    wherein a correspondence relationship between the annotation target and the annotation is determined based on the designation by the user.

2. The image processing device according to claim 1, wherein
the processor is operable to calculate an evaluation value of each of the combinations based on the information regarding the display positions of the plurality of annotations in each of the combinations, and
the information regarding the display positions of the plurality of annotations includes at least one of:
a distance between the annotation and another annotation;
a display color of the annotation and a color of the display position of the annotation; and
an edge amount of the display position of the annotation.

3. The image processing device according to claim 1, wherein
the plurality of annotations includes a first annotation that is already added to a first annotation target included in the image and a second annotation that is newly added to a second annotation target included in the image, and
the processor is operable to, when obtaining the combinations, obtain a display position of the second annotation based on a position or an area of the second annotation target, and obtain a new display position of the first annotation based on a position or an area of the first annotation target.

4. The image processing device according to claim 1, wherein
the processor is operable to, when obtaining the combinations, obtain the display position of the annotation based on at least one of a size and a shape of the area of the annotation target to which to add said annotation.

5. The image processing device according to claim 1, wherein
the processor is operable to, when obtaining the combinations, obtain the display position of the annotation based on the position or the area of the annotation target to which to add said annotation and at least one of a length, a display color, a display size, and a writing direction of said annotation.

6. The image processing device according to claim 1, wherein
the processor is further operable to obtain an edge amount of a pixel of the image, and
the processor is operable to, when obtaining the combinations, obtain the display position of the annotation based on the edge amount of the pixel of the image and the position or the area of the annotation target to which to add said annotation.

7. The image processing device according to claim 1, wherein
the processor is further operable to obtain a saliency map of the image, and
the processor is operable to, when obtaining the combinations, obtain the display position of the annotation based on the saliency map and the position or the area of the annotation target to which to add said annotation.

8. An image processing device, comprising:
a processor; and
a memory device that stores a plurality of instructions,
wherein when the processor executes the instructions in the memory device, the processor is operable to:
obtain annotation target information for indicating an annotation target to which to add an annotation, the annotation target being included in an image;
obtain annotation information indicating an annotation; and
determine a display position of the annotation based on a position or an area of the annotation target,
determine a plurality of kinds of annotation types, wherein the plurality of kinds of annotation types include a first type and a second type, and the processor is operable to:
obtain, before the annotation information is obtained, a first display position candidate corresponding to the first type of the annotation based on the position or the area of the annotation target, and store the obtained first display position candidate corresponding to the first type,
obtain, before the annotation information is obtained, a second display position candidate corresponding to the second type of the annotation based on the position or the area of the annotation target, and store the obtained second display position candidate corresponding to the second type,
determine, after the annotation information is obtained, which of the plurality of kinds of annotation types the annotation indicated by the annotation information belongs to,
determine, after the annotation information is obtained:
(a) the first display position candidate corresponding to the first type as a display position of an annotation if the determined type of the annotation is the first type, and
(b) the second display position candidate corresponding to the second type as the display position of the annotation indicated by the annotation information if the determined type of the annotation is the second type,
wherein the processor is operable to:
receive designation of the annotation target from a user; and
receive, from the user, designation of the annotation which corresponds to the annotation target designated by the user,
wherein a correspondence relationship between the annotation target and the annotation is determined based on the designation by the user, and
position and display the annotation based on the determined display position.

9. The image processing device according to claim 8, wherein
the plurality of kinds of annotation types are set based on at least one of a length, a display color, a display size, and a writing direction of an annotation.

10. The image processing device according to claim 8, wherein
the processor is operable to:
determine, before the annotation information is obtained, as to each of a plurality of kinds of length information concerning a length of an annotation, a display position of an annotation having a length indicated by the length information in a case where it is assumed that the annotation is added to the annotation target, based on the position or the area of the annotation target, and obtains the determined display position as a display position candidate corresponding to the length information, and
determine, when the annotation information is obtained, the display position of the annotation indicated by the annotation information based on a display position candidate corresponding to a length of the annotation.

11. The image processing device according to claim 8, wherein
the processor is operable to:
determine, before the annotation information is obtained, as to each of a plurality of kinds of display color information concerning a display color of an annotation, a display position of an annotation having a display color indicated by the display color information in a case where it is assumed that the annotation is added to the annotation target, based on the position or the area of the annotation target, and obtains the determined display position as a display position candidate corresponding to the display color information, and
determine, when the annotation information is obtained, the display position of the annotation indicated by the annotation information based on a display position candidate corresponding to a display color of the annotation.

12. The image processing device according to claim 8, wherein
the processor is operable to:
determine, before the annotation information is obtained, as to each of a plurality of kinds of display size information concerning a display size of an annotation, a display position of an annotation having a display size indicated by the display size information in a case where it is assumed that the annotation is added to the annotation target, based on the position or the area of the annotation target, and obtains the determined display position as a display position candidate corresponding to the display size information, and
determine, when the annotation information is obtained, the display position of the annotation indicated by the annotation information based on a display position candidate corresponding to a display size of the annotation.

13. The image processing device according to claim 8, wherein
the processor is operable to:
determine, before the annotation information is obtained, as to each of a plurality of kinds of writing direction information concerning a writing direction of an annotation, a display position of an annotation having a writing direction indicated by the writing direction information in a case where it is assumed that the annotation is added to the annotation target, based on the position or the area of the annotation target, and obtains the determined display position as a display position candidate corresponding to the writing direction information, and
determine, when the annotation information is obtained, the display position of the annotation indicated by the annotation information based on a display position candidate corresponding to a writing direction of the annotation.

14. The image processing device according to claim 8, wherein
another annotation is already added to the image, and
the processor is operable to:
determine, before the annotation information is obtained, as to each of a plurality of kinds of annotation types, the display position of the annotation and a new display position of the other annotation where the annotation belongs to the type, based on the position or the area of the annotation target and a position or an area of an annotation target corresponding to the other annotation, and obtains the determined display position as a display position candidate corresponding to the type, and
determine, when the annotation information is obtained, a display position of an annotation indicated by the annotation information and the new display position of the other annotation based on a display position candidate corresponding to a type to which the annotation belongs.

15. An image processing device, comprising:
a processor; and
a memory device that stores a plurality of instructions,
wherein when the processor executes the instructions in the memory device, the processor is operable to:
obtain annotation target information for indicating an annotation target to which to add an annotation, the annotation target being included in an image;
obtain annotation information indicating an annotation; and
determine a display position of the annotation based on a position or an area of the annotation target,
wherein the processor is operable to determine the display position of the annotation based on an evaluation of: a display color of the position or the area in the image with which the annotation is associated and at which the annotation is displayed, and a display color of the annotation,
wherein the processor is operable to:
receive designation of the annotation target from a user; and
receive, from the user, designation of the annotation which corresponds to the annotation target designated by the user,
wherein a correspondence relationship between the annotation target and the annotation is determined based on the designation by the user.

16. The image processing device according to claim 15, wherein
the processor is operable to:
based on information indicating a model combination of colors, determine whether or not a combination of the display color of the annotation and a color of an area within the image coincides with the model combination; and
in a case where it is determined that the combination of the display color of the annotation and the color of the area coincides with the model combination, determine a position within the area as the display position of the annotation.

17. A method for image processing comprising:
obtaining, with an image processing device, annotation target information for indicating an annotation target to which to add an annotation, the annotation target being included in an image;
obtaining, with the image processing device, annotation information indicating an annotation;
determining, with the image processing device, a display position of the annotation based on a position or an area of the annotation target;
where a plurality of annotations are added to the image, obtaining, with the image processing device, a plurality of kinds of combinations of display positions of the plurality of annotations, the display positions of the plurality of annotations in each of the combinations being obtained based on the position or the area of the annotation target;

calculating, with the image processing device, an evaluation value of each of the combinations based on the display positions of the plurality of annotations in each of the combinations;

determining, with the image processing device, the display positions of the plurality of annotations based on a combination selected from among the combinations based on the evaluation value of each of the combinations, wherein the plurality of annotations comprise a first annotation corresponding to a first annotation target;

obtaining, with the image processing device, a plurality of display position candidates of the first annotation based on at least one of:
- the display positions of other annotations of the plurality of annotations,
- the positions of the annotation targets corresponding to the other annotations of the plurality of annotations, or
- the shape or size of the areas of the annotation targets corresponding to the other annotations of the plurality of annotations;

receiving, at the image processing device, designation of the annotation target from a user; and receiving from the user, at the image processing device, designation of the annotation which corresponds to the annotation target designated by the user, wherein a correspondence relationship between the annotation target and the annotation is determined based on the designation by the user.

18. A non-transitory computer readable information storage medium storing a program for causing a computer to:

obtain annotation target information for indicating an annotation target to which to add an annotation, the annotation target being included in an image;

obtain annotation information indicating an annotation;

determine a display position of the annotation based on a position or an area of the annotation target;

where a plurality of annotations are added to the image, obtain a plurality of kinds of combinations of display positions of the plurality of annotations, the display positions of the plurality of annotations in each of the combinations being obtained based on the position or the area of the annotation target;

calculate an evaluation value of each of the combinations based on the display positions of the plurality of annotations in each of the combinations;

determine the display positions of the plurality of annotations based on a combination selected from among the combinations based on the evaluation value of each of the combinations, wherein the plurality of annotations comprise a first annotation corresponding to a first annotation target;

obtain a plurality of display position candidates of the first annotation based on at least one of:
- the display positions of other annotations of the plurality of annotations,
- the positions of the annotation targets corresponding to the other annotations of the plurality of annotations, or
- the shape or size of the areas of the annotation targets corresponding to the other annotations of the plurality of annotations;

receive designation of the annotation target from a user; and receive, from the user, designation of the annotation which corresponds to the annotation target designated by the user, wherein a correspondence relationship between the annotation target and the annotation is determined based on the designation by the user.

19. A method for image processing comprising:

obtaining, with an image processing device, annotation target information for indicating an annotation target to which to add an annotation, the annotation target being included in an image;

obtaining, with the image processing device, annotation information indicating an annotation;

determining, with the image processing device, a display position of the annotation based on a position or an area of the annotation target, determining, with the image processing device, a plurality of kinds of annotation types, wherein the plurality of kinds of annotation types include a first type and a second type;

obtaining with the image processing device, before the annotation information is obtained, a first display position candidate corresponding to the first type of the annotation based on the position or the area of the annotation target, and store the obtained first display position candidate corresponding to the first type;

obtaining with the image processing device, before the annotation information is obtained, a second display position candidate corresponding to the second type of the annotation based on the position or the area of the annotation target, and store the obtained second display position candidate corresponding to the second type;

determining, with the image processing device, after the annotation information is obtained, which of the plurality of kinds of annotation types the annotation indicated by the annotation information belongs to;

determining with the image processing device, after the annotation information is obtained:
(a) the first display position candidate corresponding to the first type as a display position of an annotation if the determined type of the annotation is the first type, and
(b) the second display position candidate corresponding to the second type as the display position of the annotation indicated by the annotation information if the determined type of the annotation is the second type, receiving, at the image processing device, designation of the annotation target from a user; and receiving at the image processing device, from the user, designation of the annotation which corresponds to the annotation target designated by the user, wherein a correspondence relationship between the annotation target and the annotation is determined based on the designation by the user, and positioning and displaying the annotation based on the determined display position.

20. A non-transitory computer readable information storage medium storing a program for causing a computer to:

obtain annotation target information for indicating an annotation target to which to add an annotation, the annotation target being included in an image;

obtain annotation information indicating an annotation, determine a display position of the annotation based on a position or an area of the annotation target;

determine a plurality of kinds of annotation types, wherein the plurality of kinds of annotation types include a first type and a second type;

obtain, before the annotation information is obtained, first display position candidate corresponding to the first type of the annotation based on the position or the area of the annotation target, and store the obtained first display position candidate corresponding to the first type;

obtain, before the annotation information is obtained, a second display position candidate corresponding to the second type of the annotation based on the position or the area of the annotation target, and store the second obtained display position candidate corresponding to the second type;

determine, after the annotation information is obtained, which of the plurality of kinds of annotation types the annotation indicated by the annotation information belongs to;

determine, after the annotation information is obtained:
(a) the first display position candidate corresponding to the first type as a display position of an annotation if the determined type of the annotation is the first type, and
(b) the second display position candidate corresponding to the second type as the display position of the annotation indicated by the annotation information if the determined type of the annotation is the second type, receive designation of the annotation target from a user; and receive, from the user, designation of the annotation which corresponds to the annotation target designated by the user, wherein a correspondence relationship between the annotation target and the annotation is determined based on the designation by the user, and position and display the annotation based on the determined display position.

21. A method for image processing comprising:

obtaining, with an image processing device, annotation target information for indicating an annotation target to which to add an annotation, the annotation target being included in an image;

obtaining, with the image processing device, annotation information indicating an annotation;

determining, with the image processing device, a display position of the annotation based on a position or an area of the annotation target;

determining, with the image processing device, the display position of the annotation based on an evaluation of: a display color of the position or the area in the image with which the annotation is associated and at which the annotation is displayed, and a display color of the annotation;

receiving at the image processing device, designation of the annotation target from a user; and receiving at the image processing device, from the user, designation of the annotation which corresponds to the annotation target designated by the user, wherein a correspondence relationship between the annotation target and the annotation is determined based on the designation by the user.

22. A non-transitory computer readable information storage medium storing a program for causing a computer to:

obtain annotation target information for indicating an annotation target to which to add an annotation, the annotation target being included in an image;

obtain annotation information indicating an annotation;

determine a display position of the annotation based on a position or an area of the annotation target;

determine the display position of the annotation based on an evaluation of: a display color of the position or the area in the image with which the annotation is associated and at which the annotation is displayed, and a display color of the annotation;

receive designation of the annotation target from a user; and receive, from the user, designation of the annotation which corresponds to the annotation target designated by the user, wherein a correspondence relationship between the annotation target and the annotation is determined based on the designation by the user.

* * * * *